United States Patent
Ito

(10) Patent No.: US 12,215,483 B2
(45) Date of Patent: Feb. 4, 2025

(54) CONSTRUCTION MACHINE

(71) Applicant: HITACHI CONSTRUCTION MACHINERY CO., LTD., Tokyo (JP)

(72) Inventor: Kazuyuki Ito, Kobe (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 231 days.

(21) Appl. No.: 17/908,985

(22) PCT Filed: Sep. 16, 2021

(86) PCT No.: PCT/JP2021/034126
§ 371 (c)(1),
(2) Date: Sep. 2, 2022

(87) PCT Pub. No.: WO2022/070954
PCT Pub. Date: Apr. 7, 2022

(65) Prior Publication Data
US 2023/0098211 A1    Mar. 30, 2023

(30) Foreign Application Priority Data

Sep. 30, 2020  (JP) .................................. 2020-165708

(51) Int. Cl.
*E02F 9/22* (2006.01)
*E02F 3/32* (2006.01)
(Continued)

(52) U.S. Cl.
CPC .............. *E02F 9/2221* (2013.01); *E02F 3/32* (2013.01); *E02F 3/43* (2013.01); *E02F 9/26* (2013.01); *G01G 19/10* (2013.01)

(58) Field of Classification Search
CPC ... E02F 9/2221; E02F 3/32; E02F 3/43; E02F 9/26; G01G 19/10
(Continued)

(56) References Cited

U.S. PATENT DOCUMENTS 5,509,293 A * 4/1996 Karumanchi .......... G01G 19/10
                                                                    73/1.13
6,552,279 B1* 4/2003 Lueschow .............. G01G 19/10
                                                                    73/1.13
(Continued)

FOREIGN PATENT DOCUMENTS

JP           04-9245 B2    2/1992
JP           08-311918 A   11/1996
(Continued)

OTHER PUBLICATIONS

International Search Report of PCT/JP2021/034126 dated Dec. 7, 2021.

*Primary Examiner* — Manglesh M Patel
(74) *Attorney, Agent, or Firm* — MATTINGLY & MALUR, PC

(57) ABSTRACT

A wheel loader 1 as a construction machine has a hydraulically driven working device 2 and a controller 5,5A for measuring the weight of a load, wherein the wheel loader 1 includes a changeover switch 121 as a changeover device for switching whether to measure the weight of the load, and in a case where an attitude of the working device 2 satisfies a predetermined load measurement condition, the changeover switch 121 is valid, and pistons 222, 242 are positioned in a first area provided on one end side or in a second area provided on the other end side, the controller 5, 5A limits the command current to be output to lift arm solenoid proportional valves 45 and the bucket solenoid proportional valves 46.

4 Claims, 13 Drawing Sheets

(51) Int. Cl.
*E02F 3/43* (2006.01)
*E02F 9/26* (2006.01)
*G01G 19/10* (2006.01)

(58) Field of Classification Search
USPC .................................................... 701/50, 68
See application file for complete search history.

(56) References Cited

U.S. PATENT DOCUMENTS

| | | | |
|---|---|---|---|
| 6,785,597 B1* | 8/2004 | Farber ................... | B66F 17/003 701/34.2 |
| 7,219,769 B2* | 5/2007 | Yamanouchi ......... | B66F 9/0755 414/641 |
| 9,334,883 B2* | 5/2016 | Vigholm ................. | F15B 15/18 |
| 10,030,355 B2* | 7/2018 | Yamashita ............ | E02F 9/2271 |
| 10,968,604 B2* | 4/2021 | Imura .................... | E02F 9/2271 |
| 11,022,153 B2* | 6/2021 | Green ....................... | F04B 1/16 |
| 12,084,836 B2* | 9/2024 | Igarashi ................ | E02F 9/2228 |
| 2004/0267474 A1* | 12/2004 | Drake ....................... | E02F 9/26 702/101 |
| 2013/0076799 A1* | 3/2013 | Wurzel .................. | G01K 1/026 345/690 |
| 2018/0266079 A1 | 9/2018 | Morita et al. | |
| 2019/0264422 A1* | 8/2019 | Kenkel ..................... | E02F 9/26 |

FOREIGN PATENT DOCUMENTS

| | | |
|---|---|---|
| JP | 2002-206252 A | 7/2002 |
| JP | 2018-048503 A | 3/2018 |
| JP | 2019/039606 A | 2/2019 |
| WO | 2019/039606 A1 | 2/2019 |

* cited by examiner

CONSTRUCTION MACHINE

TECHNICAL FIELD

The present invention relates to a construction machine equipped with a hydraulically driven working device.

BACKGROUND ART

A construction machine such as a hydraulic excavator or a wheel loader is equipped with a working device including a bucket for excavating work objects such as earth and sand and minerals and discharging them into dump trucks, and an arm member for rotatably supporting the bucket. The weight of the work object (hereinafter referred to as a "load") loaded within the bucket in the excavation work is automatically measured by a load weight measurement device. For example, the load weight measurement device measures the total weight of a load with the bucket being held in up (in a full tilt state), and also, while the bucket is made to dump to discharge a part of the load, measures the remaining weight of the load remaining in the bucket in real time.

Since a load exerted on the bucket finally acts on an arm cylinder which is a hydraulic cylinder for driving the arm member, the load weight measurement device calculates the load exerted on the bucket based on a cylinder pressure of the arm cylinder, whereby the weight of the load can be measured. The load weight measurement device calculates the weight of the load mainly while the bucket and/or the arm member is being operated. However, due to the geometric linkage between the bucket and the arm member via a link mechanism, a position of the center of gravity of the load changes constantly with the operational actions of the bucket and/or the arm member, which can easily lead to errors in calculation results.

In this respect, for example, Patent Literature 1 discloses a load weight measurement device for automatically measuring the weight of the load in a bucket of a loader type loading machine, which comprises a center-of-gravity correction function for correcting the position of the center of gravity of the load. The load weight measurement device according to Patent Literature 1 is configured to correct the position of the center of gravity of the load based on a tilt angle of the bucket, calculate the moment around a vehicle body mounting portion of the lift arm based on the hydraulic pressure of the lift arm cylinder, height of the bucket, and the corrected position of the center of gravity of the load so as to measure the load weight supported by the lift arm cylinder, calculate the moment around a hinge pin of the bucket based on the hydraulic pressure of a bucket cylinder and tilt angle of the bucket so as to measure the load weight supported by the bucket cylinder, and add up the load weight supported by each of the cylinders, whereby the load weight acting on the bucket can be automatically measured.

CITATION LIST

Patent Literature

Patent Literature 1: JP-B-H04-9245

SUMMARY OF INVENTION

Technical Problem

However, the cylinder pressure used in the calculation by the load weight measurement device easily fluctuates under the influence of operational actions of the working device. For example, if the working device is rapidly operated or the working device is operated until a rod of the hydraulic cylinder reaches the stroke end (cylinder end), the pressure oil flows rapidly into the cylinder or a relief state occurs, and thus the pressure may be confined in the hydraulic cylinder. In particular, if the rod of the hydraulic cylinder reaches the stroke end and the relief state occurs, the remarkable volume of pressure of the hydraulic cylinder is confined as compared with the case in which the rod is rapidly operated due to the rapid flow of the pressure oil into the hydraulic cylinder. In such a case, it is difficult for the load weight measurement device according to Patent Literature 1 to accurately measure the load weight since errors in the cylinder pressure used in the calculation reduces the calculation accuracy.

Therefore, an object of the present invention is to provide a construction machine capable of improving the accuracy of load weight measurement without reducing the operational efficiency of a working device.

Solution to Problem

In order to achieve the object described above, the present invention provides a construction machine, comprising: a hydraulic pump driven by an engine; a hydraulic cylinder operated by pressure oil discharged from the hydraulic pump; a working device operated in a vertical direction by the hydraulic cylinder; a directional control valve provided between the hydraulic pump and the hydraulic cylinder, the directional control valve being configured to control a direction and flow rate of the pressure oil to be supplied from the hydraulic pump to the hydraulic cylinder; a pilot hydraulic pump for supplying pilot pressure oil to the directional control valve; a solenoid valve configured to control pressure of the pilot pressure oil to be supplied from the pilot hydraulic pump to the directional control valve; an operation lever for outputting a signal for controlling the directional control valve via the solenoid valve; a pressure sensor configured to detect pressure of the hydraulic cylinder; an attitude sensor configured to detect an attitude of the working device; and a controller configured to measure a weight of a load loaded on the working device based on the pressure of the hydraulic cylinder detected by the pressure sensor and the attitude of the working device detected by the attitude sensor, wherein the construction machine comprises a switching device for switching whether to measure the weight of the load, and the controller is configured to, in a case where the attitude of the working device detected by the attitude sensor satisfies a predetermined load measurement condition, the switching device is valid, and a piston of the hydraulic cylinder is positioned in a first area provided in a predetermine area at a side of a first end which is one of ends of the hydraulic cylinder, or in a second area provided in a predetermined area at a side of a second end which is the other one of the ends of the hydraulic cylinder, limit a command current to be output to the solenoid valve to reduce magnitude thereof as the piston approaches the first end or the second end.

Advantageous Effects of Invention

According to the present invention, it is possible to improve the accuracy of load weight measurement without reducing the operational efficiency of a working device. The problems, configurations, and advantageous effects other than those described above will be clarified by explanation of the embodiments below.

DESCRIPTION OF EMBODIMENTS

Hereinafter, as one of the aspects of construction machines according to each embodiment of the present invention, for example, a wheel loader that excavates a work object such as earth and sand and minerals and loading the excavated work object into a loading destination such as a dump truck or a hopper will be described.

<Configuration of Wheel Loader 1>

Firstly, a configuration of a wheel loader 1 will be described with reference to FIG. 1.

Figure 1:
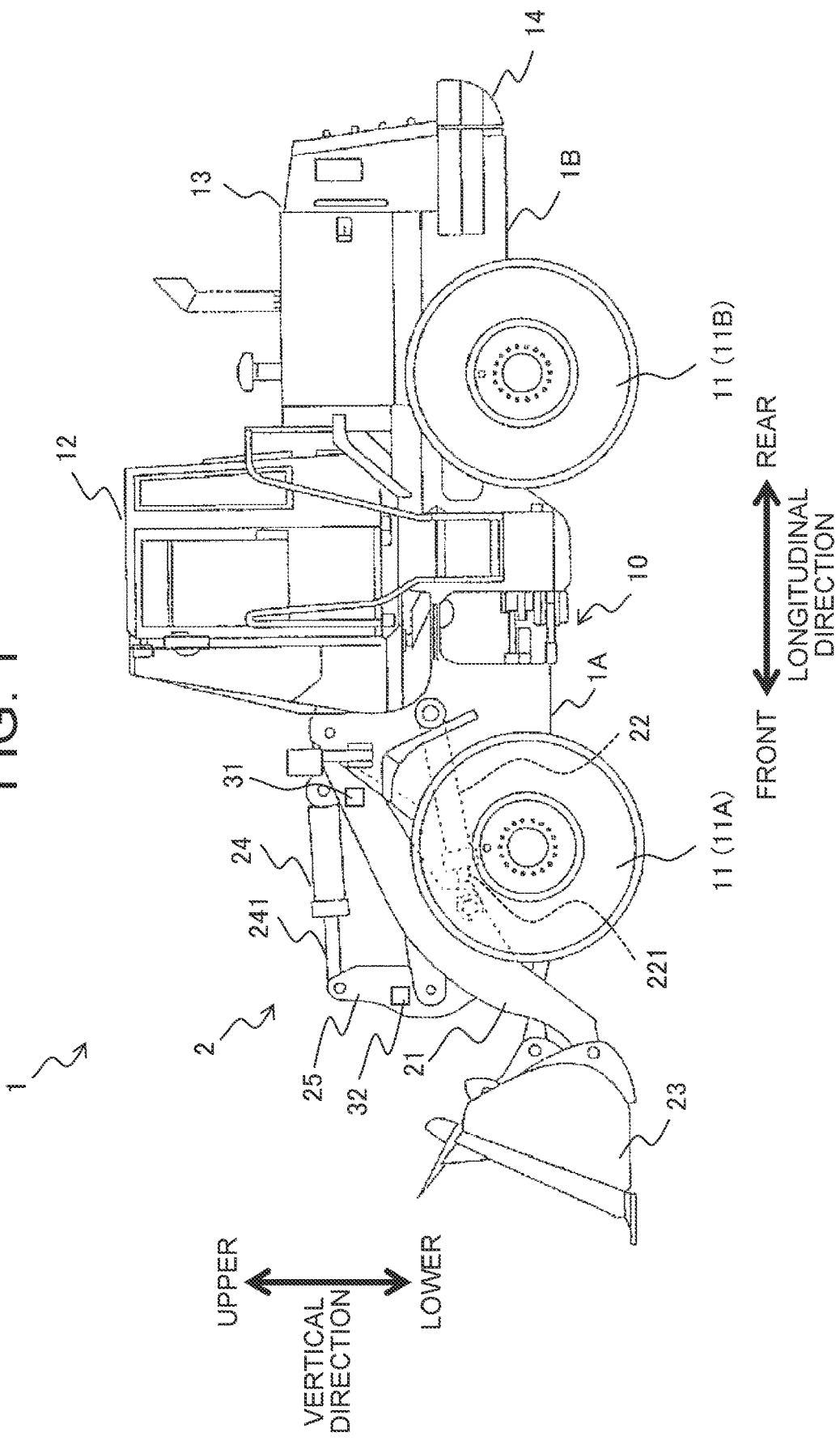
FIG. 1 is a side view of appearance illustrating a configuration example of a wheel loader according to each embodiment of the present invention.

FIG. 1 is a side view illustrating appearance of a configuration example of the wheel loader 1 according to each embodiment of the present invention.

The wheel loader 1 is an articulated type work vehicle which is swiveled on a central portion of a vehicle body and steered thereby. Specifically, a front frame 1A that is the front part of the vehicle body and a rear frame 1B that is the rear part of the vehicle body are connected to each other by a center joint 10 to swivel in the left and right direction so that the front frame 1A is bent in the left and right direction with respect to the rear frame 1B.

The vehicle body is provided with four wheels 11, namely, two of the wheels 11 are provided, as front wheels 11A, on the left and right sides of the front frame 1A, respectively, and the remaining two of the wheels 11 are provided, as rear wheels 11B, on the left and right sides of the rear frame 1B, respectively. FIG. 1 illustrates, among the four wheels 11, only the front wheel 11A and the rear wheel 11B provided on the left side. On a front portion of the front frame 1A, a working device 2 which is hydraulically driven and thus operated in the vertical direction with respect to the front frame 1A is provided.

The working device 2 includes a lift arm 21 whose proximal end portion is rotatably attached to the front frame 1A, two lift arm cylinders 22 for driving the lift arm 21 as a hydraulic cylinder, a bucket 23 rotatably attached to the distal end portion of the lift arm 21, a bucket cylinder 24 for driving the bucket 23 as a hydraulic cylinder, and a bell crank 25 rotatably connected to the lift arm 21 and serving as a link mechanism between the bucket 23 and the bucket cylinder 24. Although the two lift arm cylinders 22 are arranged side by side in the lateral direction of the vehicle body, FIG. 1 illustrates only one of the lift arm cylinders 22 which is disposed on the left side by a broken line.

When the two lift arm cylinders 22 are supplied with pressure oil (hydraulic oil), rods 221 extend or contract, whereby the lift arm 21 is driven. The lift arm 21 rotationally moves upward with respect to the front frame 1A when the rods 221 of the two lift arm cylinders 22 extend, respectively, and rotationally moves downward with respect to the front frame 1A when the rods 221 contract, respectively.

On the lift arm 21, a lift arm angle sensor 31 for detecting an angle $\alpha$ of the lift arm 21 (hereinafter, simply referred to as a "lift arm angle $\alpha$") with respect to the front frame 1A (vehicle body) is attached.

The lift arm angle sensor 31 is one of the aspects of an attitude sensor for detecting the attitude of the lift arm 21 (working device 2). A lift arm angle $\alpha$ is in correspondence with the stroke length of the rods 221 of the lift arm cylinders 22, and accordingly, it is possible to calculate the stroke length of the rods 221 of the lift arm cylinders 22 based on the lift arm angle $\alpha$ detected by the lift arm angle sensor 31.

Note that the attitude sensor of the lift arm 21 may be, other than the lift arm angle sensor 31, a position sensor and a proximity sensor and the like, which are attached to the lift arm cylinders 22 and capable of detecting the cylinder length of the lift arm cylinders 22.

Furthermore, the lift arm angle sensor 31 is also one of the aspects of a height sensor for detecting the height of the lift arm 21 (position in the vertical direction of the bucket 23). The height of the lift arm 21 can be calculated based on the lift arm angle $\alpha$ detected by the lift arm angle sensor 31 and the vehicle body data including the dimension data of the working device 2.

When the bucket cylinder 24 is supplied with pressure oil (hydraulic oil), a rod 241 extends or contracts, whereby the bucket 23 is driven. In the case of the wheel loader 1 having a link mechanism as illustrated in FIG. 1, the bucket 23 tilts in accordance with the extension of the rod 241 of the bucket cylinder 24 (rotationally moves upward with respect to the lift arm 21), and dumps in accordance with the contraction of the rod 241 (rotationally moves downward with respect to the lift arm 21). Thus, the bucket 23 can scoop and discharge (dump) a work object such as earth and sand and minerals.

On the bell crank 25, a bell crank angle sensor 32 for detecting an angle $\gamma$ of the bell crank 25 (hereinafter, simply referred to as a "bell crank angle $\beta$") with respect to the lift arm 21 is attached.

The bell crank angle sensor 32 is one of the aspects of an attitude sensor for detecting the attitude of the bucket 23 (working device 2). A ground angle $\gamma$ of the bucket 23 (hereinafter, simply referred to as a "bucket angle $\gamma$") can be calculated based on the lift arm angle $\alpha$ detected by the lift arm angle sensor 31 and the bell crank angle $\beta$ detected by the bell crank angle sensor 32. Furthermore, the bell crank angle β (bucket angle γ) is in correspondence with the stroke length of the rod 241 of the bucket cylinder 24, and accordingly, it is possible to calculate the stroke length of the rod 241 of the bucket cylinder 24 based on the bell crank angle β detected by the bell crank angle sensor 32.

Note that the attitude sensor of the bucket 23 may be, other than the bell crank angle sensor 32, a position sensor and a proximity sensor and the like, which are attached to the bucket cylinder 24 and capable of detecting the cylinder length of the bucket cylinder 24.

The rear frame 1B includes an operator's cab 12 provided for an operator to get in, a machine room 13 for accommodating therein respective devices necessary for driving the wheel loader 1, and a counterweight 14 for balancing the vehicle body with the working device 2 to prevent the vehicle body from tilting. On the rear frame 1B, the operator's cab 12 is provided in the front thereof, the counterweight 14 is provided in the rear thereof, and the machine room 13 is provided between the operator's cab 12 and the counterweight 14.

<Drive System of Working Device 2>

Next, a drive system of the working device 2 will be described more specifically with reference to FIG. 2.

Figure 2:
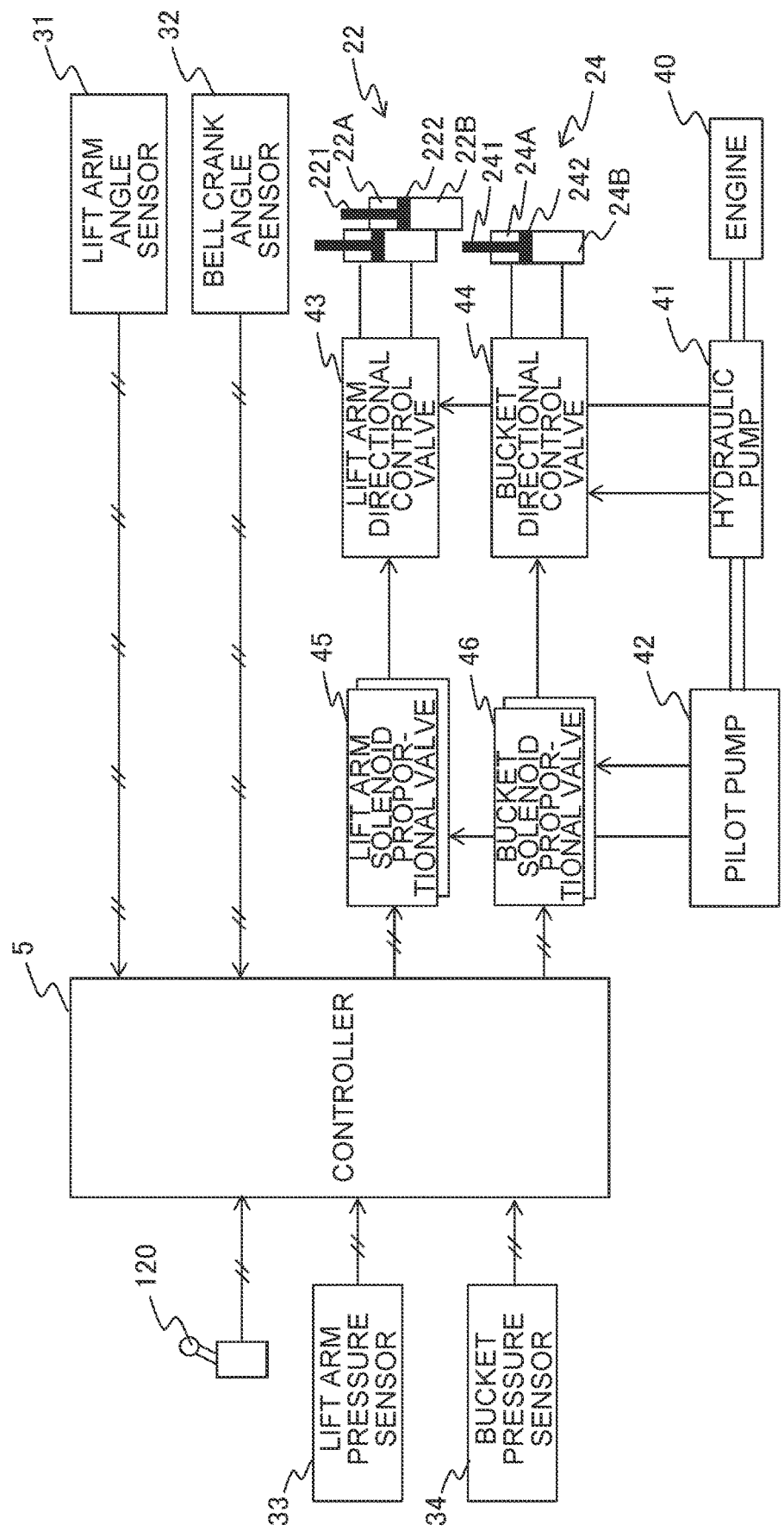
FIG. 2 is a system configuration diagram illustrating a configuration example of a drive system of a working device.

FIG. 2 is a system configuration diagram illustrating a configuration example of the drive system of the working device 2.

As illustrated in FIG. 2, the drive system of the working device 2 includes a hydraulic pump 41 and a pilot hydraulic pump 42 which are driven by an engine 40, a lift arm directional control valve 43 provided between the hydraulic pump 41 and the two lift arm cylinders 22, a bucket directional control valve 44 provided between the hydraulic pump 41 and the bucket cylinder 24, a pair of lift arm solenoid proportional valves 45 for controlling the lift arm directional control valve 43, a pair of bucket solenoid proportional valves 46 for controlling the bucket directional control valve 44, and a controller 5 for controlling the pair of lift arm solenoid proportional valves 45 and the pair of bucket solenoid proportional valves 46.

The hydraulic pump 41 supplies pressure oil (hydraulic oil) to the two lift arm cylinders 22 and the bucket cylinder 24, respectively. The pilot hydraulic pump 42 (hereinafter, simply referred to as a "pilot pump 42") supplies pilot pressure oil to left and right oil chambers of the lift arm directional control valve 43 and left and right oil chambers of the bucket directional control valve 44.

The lift arm directional control valve 43 is a spool valve with a spool provided therein, and configured to control the flow (direction and flow rate) of the pressure oil supplied from the hydraulic pump 41 to each of the two lift arm cylinders 22.

Each of the pair of lift arm solenoid proportional valves 45 is a solenoid valve for controlling the pressure of the pilot pressure oil supplied from the pilot pump 42 to the lift arm directional control valve 43 based on a command current output from the controller 5. Specifically, one of the lift arm solenoid proportional valves 45 controls the pilot pressure acting on the left oil chamber of the lift arm directional control valve 43 while the other one of the lift arm solenoid proportional valves 45 controls the pilot pressure acting on the right oil chamber of the lift arm directional control valve 43, respectively, whereby the movement of the spool of the lift arm directional control valve 43 is controlled.

When the pressure oil discharged from the hydraulic pump 41 is supplied to bottom chambers 22B of the two lift arm cylinders 22 via the lift arm directional control valve 43, the rods 221 extend respectively, and thus the lift arm 21 rotationally moves upward relative to the vehicle body. On the other hand, when the pressure oil discharged from the hydraulic pump 41 is supplied to rod chambers 22A of the two lift arm cylinders 22 via the lift arm directional control valve 43, the rods 221 contract respectively, and thus the lift arm 21 rotationally moves downward relative to the vehicle body.

Similarly, the bucket directional control valve 44 is a spool valve with a spool provided therein, and configured to control the flow (direction and flow rate) of the pressure oil supplied from the hydraulic pump 41 to the bucket cylinder 24.

Each of the pair of bucket solenoid proportional valves 46 is a solenoid valve for controlling the pressure of the pilot pressure oil supplied from the pilot pump 42 to the bucket directional control valve 44 based on a command current output from the controller 5. Specifically, one of the bucket solenoid proportional valves 46 controls the pilot pressure acting on the left oil chamber of the bucket directional control valve 44 while the other one of the bucket solenoid proportional valves 46 controls the pilot pressure acting on the right oil chamber of the bucket directional control valve 44, respectively, whereby the movement of the spool of the bucket directional control valve 44 is controlled.

When the pressure oil discharged from the hydraulic pump 41 is supplied to a bottom chamber 24B of the bucket cylinder 24 via the bucket directional control valve 44, the rod 241 extends and thus the bucket 23 tilts. On the other hand, when the pressure oil discharged from the hydraulic pump 41 is supplied to a rod chamber 24A of the bucket cylinder 24 via the bucket directional control valve 44, the rod 241 contracts and thus the bucket 23 dumps.

The controller 5 is electrically connected to an electric operation lever 120 which is an operation device for operating the working device 2 (lift arm 21 and bucket 23), the lift arm angle sensor 31, and the bell crank angle sensor 32, respectively.

The operation lever 120 is provided in the operator's cab 12, and when the operator operates the operation lever 120, an operation signal corresponding to the operation direction and operation amount is output to the controller 5. The operation signal output from the operation lever 120 corresponds to a signal for controlling the lift arm directional control valve 43 via the pair of lift arm solenoid proportional valves 45, or a signal for controlling the bucket directional control valve 44 via the pair of bucket solenoid proportional valves 46.

When detecting the lift arm angle α, the lift arm angle sensor 31 outputs the data thereof to the controller 5. Similarly, when detecting the bell crank angle the bell crank angle sensor 32 outputs the data thereof to the controller 5.

Furthermore, for example, while the wheel loader 1 is performing a dump approach operation, the controller 5 measures the weight of the load loaded into the working device 2 based on the pressure of the lift arm cylinders 22 and attitude of the lift arm 21, or the pressure of the bucket cylinder 24 and attitude of the bucket 23.

As described above, the attitude of the lift arm 21 is detected by the lift arm angle sensor 31, and the attitude of the bucket 23 is detected by the bell crank angle sensor 32, respectively. Furthermore, the pressure of the lift arm cylinders 22 is detected by a lift arm pressure sensor 33 attached to either one of the two lift arm cylinders 22, and the pressure of the bucket cylinder 24 is detected by a bucket pressure sensor 34 attached to the bucket cylinder 24, respectively.

<Dump Approach Operation of Wheel Loader 1>

Next, the dump approach operation performed by the wheel loader 1 will be described with reference to FIG. 3.

Figure 3:
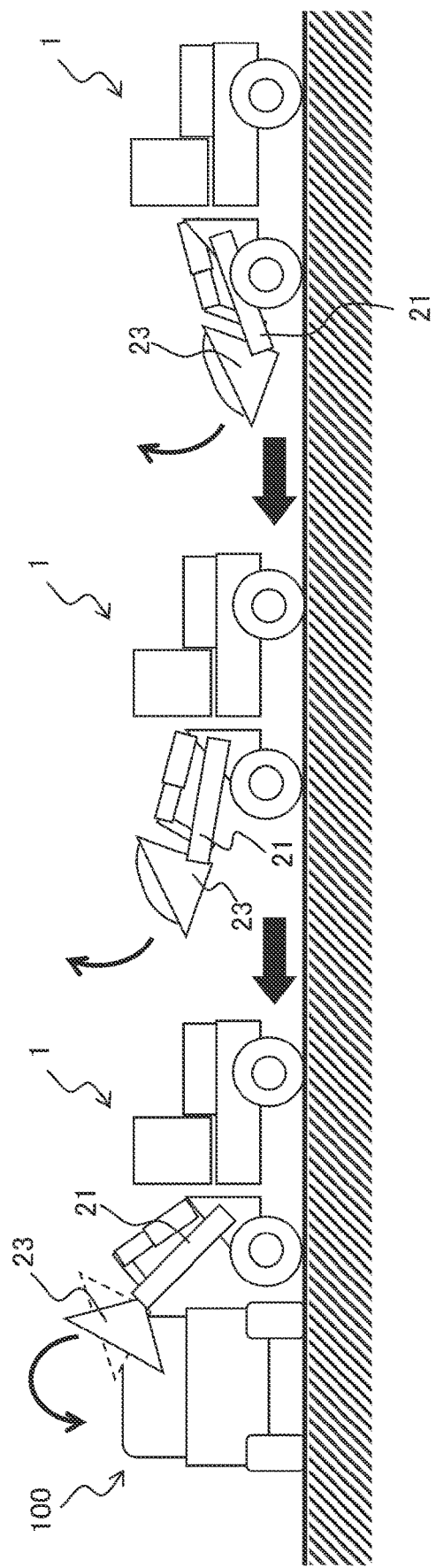
FIG. 3 is a diagram for explaining a dump approach operation performed by a wheel loader.

FIG. 3 is a diagram for explaining the dump approach operation performed by the wheel loader 1.

The wheel loader 1 travels forward toward the pile which is an object to be excavated, and makes the bucket 23 thrust into the pile to carry out the excavation work. Upon completion of the excavation work, the wheel loader 1 carries out the loading work by loading the load (payload) such as earth and sand and minerals mounted in the bucket 23 into a dump truck 100 which is a loading destination. The operational actions performed by the wheel loader 1 in this loading work may be referred to as the "dump approach operation".

In the dump approach operation, as illustrated in FIG. 3, firstly, the operator steps on an accelerator pedal fully to obtain a full acceleration state, and also operates the operation lever 120 to raise the lift arm 21 (state illustrated on the right side of FIG. 3).

Next, the operator adjusts the vehicle speed by stepping on a brake pedal a little at the same time while further raising the lift arm 21 with maintaining the full acceleration state, so as to prevent the vehicle body from colliding with the dump truck 100 (state illustrated in the center of FIG. 3).

Then, the operator steps on the brake pedal fully to stop the vehicle body in front of the dump truck 100, and operates the operation lever 120 to make the bucket 23 dump (state illustrated on the left side of FIG. 3). Thus, the load in the bucket 23 is loaded into the dump truck 100.

During this dump approach operation, the controller 5 measures the weight of the load in the bucket 23 in two stages. Firstly, as a first stage, the controller 5 measures the total weight of the load in the bucket 23 while the bucket 23 is in the full tilt state and the lift arm 21 is being raised (state illustrated on the right side of FIG. 3 and state illustrated in the center of FIG. 3). Then, as a second stage, while a part of the load in the bucket 23 is being dumped into the dump truck 100 (state illustrated on the left side of FIG. 3), the controller 5 measures the remaining weight of the load remaining in the bucket 23 after adjusting the weight of the load.

A weight W of the load in the bucket 23 is obtained by dividing a value, which is obtained by subtracting an empty load moment $M_0$ from a load moment $M_1$, by a center-of-gravity horizontal length Lw of the load weight ($W=(M_1-M_0)/Lw$).

Here, the "load moment $M_1$" is a moment around a hinge pin of the lift arm 21 with respect to the front frame 1A while the load is present in the bucket 23 (loaded state), and is calculated based on the pressure (bottom pressure) of the lift arm cylinders 22 detected by the lift arm pressure sensor 33. The "empty load moment $M_0$" is a moment around the hinge pin of the lift arm 21 with respect to the front frame 1A while no load is present in the bucket 23 (empty state), and is calculated using designed values of the working device 2. The "center-of-gravity horizontal length Lw of the load weight" is a horizontal distance from a position of the hinge pin of the lift arm 21 with respect to the front frame 1A to a position of the center of gravity of the load, and is calculated using the designed values of the working device 2.

In the measurement of the total weight of the load in the first stage, since only the lift arm 21 moves upward while the bucket 23 is stationary in the full tilt state, a position of the center of gravity of the load in the bucket 23 is relatively stable. Accordingly, accurate calculation results can be easily obtained.

On the other hand, in the measurement of the remaining weight of the load in the second stage, since a position of the center of gravity of the load remaining in the bucket 23 fluctuates as a part of the load is dumped, the accuracy is reduced as compared with the measurement of the total weight of the load in the first stage. Therefore, for example, in the measurement of the remaining weight of the load in the second stage, it is desirable to correct the position of the center of gravity of the load by using the pressure (bottom pressure) of the bucket cylinder 24 detected by the bucket pressure sensor 34.

Here, in the loading work carried out by the wheel loader 1, for example, the case where a loading operation is completed when two and a half buckets of the earth and sand in the bucket 23 are loaded into the dump truck 100 is assumed. In this case, measurement of the weight of the earth and sand to be loaded after the two buckets of the earth and sand are loaded into the dump truck 100 is important. In particular, the controller 5 is required to measure the load weight in the second stage with high accuracy.

Thus, since the controller 5 calculates the load weight based on the pressure of the lift arm cylinders 22 detected by the lift arm pressure sensor 33 and the pressure of the bucket cylinder 24 detected by the bucket pressure sensor 34, in order not to reduce the accuracy of the weight measurement executed by the controller 5, it is necessary to prevent the pressure from being confined in each of the lift arm cylinders 22 and the bucket cylinder 24.

The pressure in the lift arm cylinders 22 is confined when the lift arm 21 is operated rapidly, raised to the highest position, or lowered to the lowest position. Here, "when the lift arm 21 is raised to the highest position" corresponds to the case in which the rods 221 extend until pistons 222 of the lift arm cylinders 22 reach one ends (stroke end), respectively. Furthermore, "when the lift arm 21 is lowered to the lowest position" corresponds to the case in which the rods 221 contract until the pistons 222 of the lift arm cylinders 22 reach the other ends (stroke end), respectively.

The pressure in the bucket cylinder 24 is confined when the bucket 23 is operated rapidly, fully tilted, or fully dumped. Here, "when the bucket 23 is fully tilted" corresponds to the case in which the rod 241 extends until a piston 242 of the bucket cylinder 24 reaches one end (stroke end). Furthermore, "when the bucket 23 is fully dumped" corresponds to the case in which the rod 241 contracts until the piston 242 of the bucket cylinder 24 reaches the other end (stroke end).

In particular, in the case of the wheel loader 1, the load weight measurement in the second stage, that is, the measurement of the remaining weight of the load in the controller 5 is executed while the lift arm 21 is raised and the bucket 23 is once put into the full tilt state after the bucket 23 dumps to discharge a part of the load. However, in this case, the pressure is likely to be confined in each of the cylinders 22, 24 since the pistons 222 of the lift arm cylinders 22 may collide with the ends at the lifting operation side (extension side), or the piston 242 of the bucket cylinder 24 may collide with the end on the tilting operation side (extension side).

Therefore, the controller 5 needs to limit the operational actions of the lift arm cylinders 22 at the stroke end of the rod chamber 22A side (longest extension side), which corresponds to the lifting operation of the lift arm 21, in the lift arm cylinders 22 and also the operational actions of the bucket cylinder 24 at the stroke end of the rod chamber 24A side (longest extension side), which corresponds to the tilting operation of the bucket 23, in the bucket cylinder 24.

Note that the reason why "the bucket 23 is once put into the full tilt state after the bucket 23 dumps to discharge a part of the load" is that, when the lift arm cylinders 22 extend and thus the bucket 23 moves to be positioned at the height in which the load is to be mounted, if the bucket 23 is tilted to some extent, the measurement of the remaining weight of the load in the controller 5 can be executed with less fluctuation in a position of the center of gravity and with higher accuracy as compared with the case where the bucket 23 is dumped to some extent.

On the other hand, if the bucket 23 is tilted too much, as described above, the piston 242 of the bucket cylinder 24 may collide with the end at the tilting operation side (extension side) and thus the pressure in the bucket cylinder 24 may be confined. This leads to reduction in the accuracy of measurement in the controller 5. Therefore, the controller 5 needs to limit the operational actions of the bucket cylinder 24 at the end of the rod chamber 24A side, which corresponds to the tilting operation, in the bucket cylinder 24.

As described above, in the case of the wheel loader 1, in order to improve the accuracy of weight measurement of the load in the controller 5, it is necessary to limit the operational actions at the two stroke ends of the hydraulic cylinders, that is, the stroke end at the rod chamber 22A side (longest extension side), which corresponds to the lifting operation of the lift arm 21, in the lift arm cylinders 22 and the stroke end at the rod chamber 24A side (longest extension side), which correspond to the tilting operation of the bucket 23, in the bucket cylinder 24. In the following, the limitation in the operational actions executed by the controller 5, that is, the limitation in the operational actions of the lift arm cylinders 22 at the side of the lifting operation of lift arm 21 (limitation control for one of the lift arm solenoid proportional valves 45) and the limitation in the operational actions of the bucket cylinder 24 at the side of the tilting operation of the bucket 23 (limitation control for one of the bucket solenoid proportional valves 46) will be described for each embodiment.

Note that in the case of a wheel loader equipped with a working device having a link mechanism different from that of the working device 2 of the wheel loader 1, or in the case of a construction machine other than wheel loaders, the preconditions for the limitation in operational actions of hydraulic cylinders may be different from the ones required in the wheel loader 1. Therefore, the limitation processing of the operational actions of the hydraulic cylinders executed by the controller 5 is not limited to those in the following embodiments.

First Embodiment

The controller 5 according to a first embodiment of the present invention will be described with reference to FIG. 4 and FIG. 5.
(Configuration of Controller 5)

Firstly, a configuration of the controller 5 will be described with reference to FIG. 4.

Figure 4:
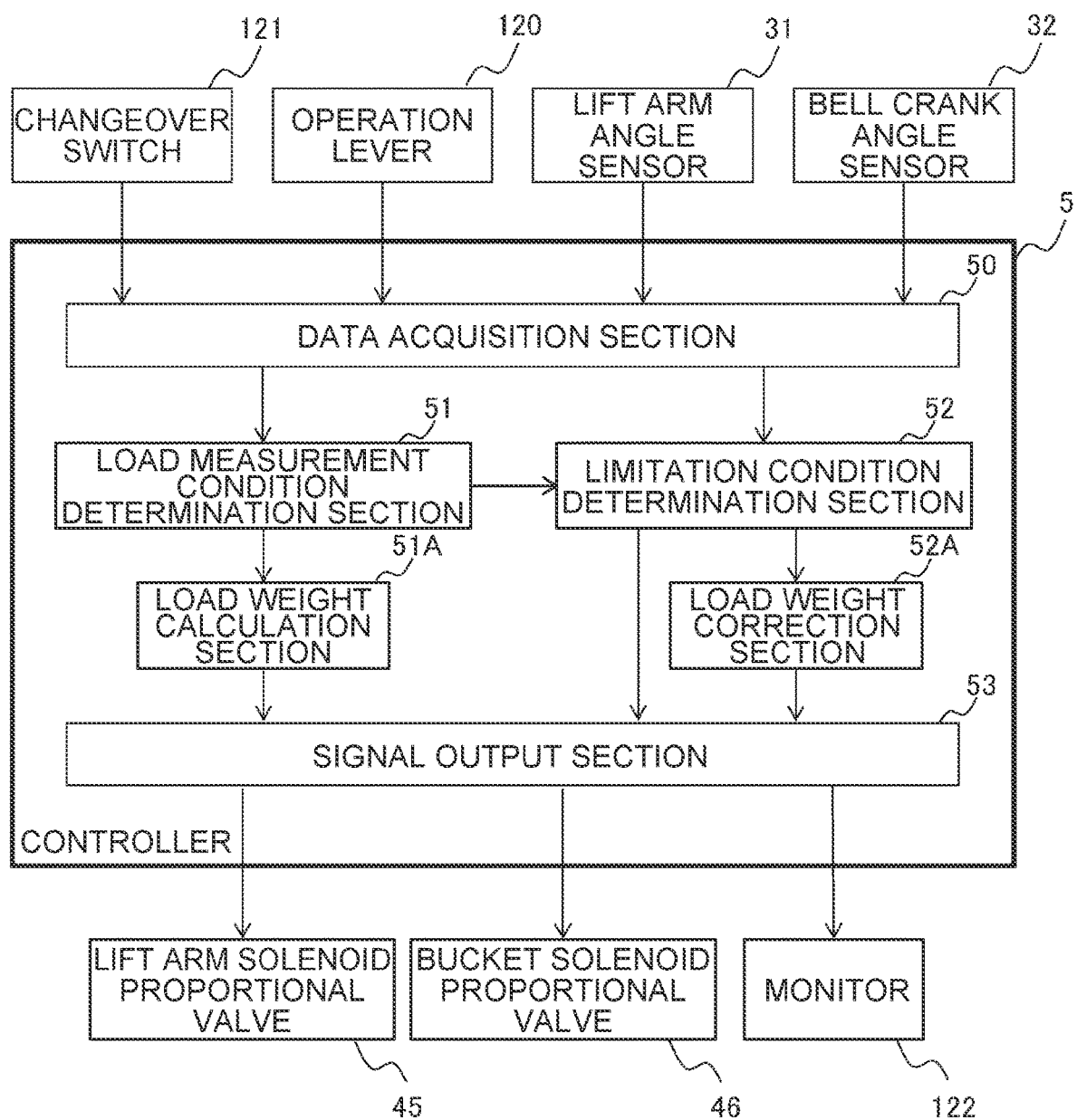
FIG. 4 is a functional block diagram illustrating functions of a controller according to a first embodiment.

FIG. 4 is a functional block diagram illustrating functions of the controller 5 according to the first embodiment.

The controller 5 is configured such that a CPU, a RAM, a ROM, an HDD, an input I/F, and an output I/F are connected to each other via a bus. Various operation devices such as the operation lever 120 and a changeover switch 121, and various sensors such as the lift arm angle sensor 31 and the bell crank angle sensor 32 are connected to the input I/F, and the lift arm solenoid proportional valves 45, the bucket solenoid proportional valves 46, and the monitor 122 are connected to the output I/F, respectively.

In this hardware configuration, the CPU reads out a control program (software) stored in a recording medium such as the ROM, the HDD or an optical disc, and loads and executes the control program on the RAM, whereby the control program and the hardware collaborate to implement the functions of the controller 5.

In the present embodiment, the controller 5 is described as a computer configured by a combination of software and hardware. However, the controller 5 is not limited thereto, and as one of the examples of configurations of other computers, an integrated circuit for implementing the functions of the control program executed on the side of the wheel loader 1 may be used.

The changeover switch 121 is a changeover device configured to switch, when a part of the load is discharged from the bucket 23 (working device 2), whether to measure the weight (remaining weight) of the load in the bucket 23 (measurement in the controller 5 in the second stage) after adjusting the weight of the load. The changeover switch 121 is provided in the operator's cab 12 (see FIG. 1). When the changeover switch 121 is switched to ON, the measurement of the remaining weight of the load in the controller 5 becomes valid, and when the changeover switch 121 is switched to OFF, the measurement of the remaining weight of the load in the controller 5 becomes invalid. The monitor 122 is one of the aspects of a display device for displaying the weight of the load measured by the controller 5, and is provided in the operator's cab 12 (see FIG. 1).

The controller 5 includes a data acquisition section 50, a load measurement condition determination section 51, a load weight calculation section 51A, a limitation condition determination section 52, a load weight correction section 52A, and a signal output section 53.

The data acquisition section 50 is configured to acquire the data relating to an operation signal output from the operation lever 120, a switching signal output from the changeover switch 121, a lift arm angle $\alpha$ output from the lift arm angle sensor 31, and a bell crank angle $\beta$ output from the bell crank angle sensor 32, respectively.

The load measurement condition determination section 51 is configured to determine whether an attitude of the working device 2 satisfies a predetermined load measurement condition based on the lift arm angle $\alpha$ detected by the lift arm angle sensor 31 and the bell crank angle $\beta$ detected by the bell crank angle sensor 32. The "predetermined load measurement condition" is a condition relating to an attitude to be taken by the working device 2 when the controller 5 measures the load in the bucket 23, in particular, which is that the lift arm angle $\alpha$ is more than a condition threshold value $\alpha 1$ of the lift arm 21 ($\alpha > \alpha 1$) and also the bucket angle $\gamma$ is more than a condition threshold value $\gamma 1$ of the bucket 23 ($\gamma > \gamma 1$).

Here, the "condition threshold value $\alpha 1$ of the lift arm 21" is an angle corresponding to the lift arm angle in a state where the bucket 23 is grounded. The "condition threshold value $\gamma 1$ of the bucket 23" is an angle corresponding to the bucket angle in a state where the bucket 23 tilts and thus is in an attitude of being held in up.

The load weight calculation section 51A is configured to calculate the weight of the load in the bucket 23 when the load measurement condition determination section 51 determines that the attitude of the working device 2 satisfies the predetermined load measurement condition.

The limitation condition determination section 52 determines, based on the lift arm angle $\alpha$ acquired by the data acquisition section 50, whether the pistons 222 of the lift arm cylinders 22 are positioned in a first area provided, as a first end of the lift arm cylinders 22, at the end side of the rod chamber 22A side corresponding to the lifting operation of the lift arm 21, that is, whether the stroke length of the lift arm cylinders 22 is near the stroke end at the extension side.

In the present embodiment, in the lift arm cylinders 22, the ends at the extension side of the rods 221 (ends at the rod chamber 22A side) are referred to as the first end, and the ends at the contraction side of the rods 221 (ends at the bottom chamber 22B side) are referred to as a second end, however, the present embodiment is not limited thereto. The ends at the contraction side of the rods 221 may be referred to as the first end while the ends at the extension side of the rods 221 may be referred to as the second end. Furthermore, in the present embodiment, the limitation condition determination section 52 determines only whether the pistons 222 of the lift arm cylinders 22 are positioned in the first area provided at the first end side, however, the present embodiment is not limited thereto. The limitation condition determination section 52 may be configured to determine at least whether the pistons 222 are positioned in the first area provided at first end side or in a second area provided at the second end side.

Since the stroke length of the rods 221 and the lift arm angle $\alpha$ are in correspondence with each other, the state in which the pistons 222 are positioned in the first area can be expressed, using angle threshold values of the lift arm 21, as "$\alpha th1 \leq \alpha \leq \alpha th2$". Note that each of the first angle threshold value $\alpha th1$ and the second angle threshold value $\alpha th2$ is an angle smaller than the lift arm angle corresponding to the first end of the lift arm cylinders 22.

Similarly, the limitation condition determination section 52 calculates the bucket angle $\gamma$ based on the bell crank angle $\beta$ acquired by the data acquisition section 50, and determines whether the piston 242 of the bucket cylinder 24 is positioned in a first area provided, as a first end of the bucket cylinder 24, at the rod chamber 24A side corresponding to the tilting operation of the bucket 23, that is, whether the stroke length of the bucket cylinder 24 is near the stroke end of the extension side.

In the present embodiment, in the bucket cylinder 24, the end at the extension side of the rod 241 (end at the rod chamber 24A side) is referred to as the first end, and the end at the contraction side (dumping operation side of the bucket 23) of the rod 241 (end at the bottom chamber 24B side) is referred to as a second end, however, the present embodiment is not limited thereto. The end at the contraction side of the rod 241 may be referred to as the first end while the end at the extension side of the rod 241 may be referred to as the second end. Furthermore, in the present embodiment, the limitation condition determination section 52 determines only whether the piston 242 of the bucket cylinder 24 is positioned in the first area provided at the first end side, however, the present embodiment is not limited thereto. The limitation condition determination section 52 may determine at least whether the rod 241 is positioned in the first area provided at the first end side or in the second area provided at the second end side.

Since the stroke length of the rod 241 and the bucket angle $\gamma$ are in correspondence with each other, a state in which the piston 242 is positioned in the first area can be expressed, using angle threshold values of the bucket 23, as "$\gamma th1 \leq \gamma \leq \gamma th2$". Note that each of the first angle threshold value $\gamma th1$ and the second angle threshold value $\gamma th2$ is an angle smaller than the bucket angle corresponding to the first end of the bucket cylinder 24.

In the present embodiment, the limitation condition determination section 52 further determines whether the changeover switch 121 is switched to ON (valid) based on the switching signal acquired by the data acquisition section 50.

The load weight correction section 52A is configured to correct and calculate the weight of the load in the bucket 23 when the limitation condition determination section 52 determines that the changeover switch 121 is valid, and also the pistons 222 of the lift arm cylinders 22 are positioned in the first area ($\alpha th1 \leq \alpha \leq \alpha th2$) or the piston 242 of the bucket cylinder 24 is positioned in the first area ($\gamma th1 \leq \gamma \leq \gamma th2$). Specifically, when the limitation of the operational actions for the lift arm cylinders 22 or bucket cylinder 24 is set, the load weight correction section 52A corrects the calculation of the load weight which is the one in the case where the limitation of the operational actions above is not set (calculation in the load weight calculation unit 51A), and calculates the load weight.

The signal output section 53 is configured to, when the load measurement condition determination section 51 determines that the attitude of the working device 2 satisfies the predetermined load measurement condition ($\alpha > \alpha 1$ and $\gamma > \gamma 1$) and also the limitation condition determination section 52 determines that the changeover switch 121 is valid and the lift arm angle $\alpha$ satisfies $\alpha th1 \leq \alpha \leq \alpha th2$ (pistons 222 are positioned in the first area), limit the magnitude of the command current to be output to the lift arm solenoid proportional valves 45 as the pistons 222 of the lift arm cylinders 22 approach the first end.

Furthermore, the signal output section 53 is configured to, when the load measurement condition determination section 51 determines that the attitude of the working device 2 satisfies the predetermined load measurement condition ($\alpha > \alpha 1$ and $\gamma > \gamma 1$) and also the limitation condition determination section 52 determines that the changeover switch 121 is valid and the bucket angle $\gamma$ satisfies $\gamma th1 \leq \gamma \leq \gamma th2$ (piston 242 is positioned in the first area), limit the magnitude of the command current to be output to the bucket solenoid proportional valves 46 as the piston 242 of the bucket cylinder 24 approaches the first end.

Thus, the rods 221 of the lift arm cylinders 22 and the rod 241 of the bucket cylinder 24 are prevented from colliding with the stroke ends, respectively, so that the pressure can be suppressed from being confined in the lift arm cylinders 22 and bucket cylinder 24, respectively. As a result, it is possible to improve the accuracy of measurement of the load weight by the controller 5.

When the load measurement condition determination section 51 determines that the attitude of the working device 2 does not satisfy the predetermined load measurement condition ($\alpha \leq \alpha 1$ or $\gamma \leq \gamma 1$), and when the limitation condition determination section 52 determines that the lift arm angle $\alpha$ does not satisfy $\alpha th1 \leq \alpha \leq \alpha th2$ ($\alpha < \alpha th1$, $\alpha > \alpha th2$) and the bucket angle $\gamma$ does not satisfy $\gamma th1 \leq \gamma \leq \gamma th2$ ($\gamma < \gamma th1$, $\gamma > \gamma th2$), the signal output section 53 outputs the command current based on the operation amount of the operation lever 120 acquired by the data acquisition section 50 to the lift arm solenoid proportional valves 45 and the bucket solenoid proportional valves 46, respectively. That is, in this case, the controller 5 does not limit the operational actions of the lift arm cylinders 22 and bucket cylinder 24.

Furthermore, in the present embodiment, when the limitation condition determination section 52 determines that the changeover switch 121 is switched to OFF, the signal output section 53 also outputs the command current based on the operation amount of the operation lever 120 acquired by the data acquisition section 50 to the lift arm solenoid proportional valves 45 and the bucket solenoid proportional valves 46, respectively.

Thus, whether to limit the command current to be output to the lift arm solenoid proportional valves 45 and the bucket solenoid proportional valves 46 by the controller 5 can be selected arbitrarily by the operator. Since the operational actions of the lift arm cylinders 22 and bucket cylinder 24 are limited only when necessary, it is possible to improve the accuracy of measurement of the load weight by the controller 5 without reducing the operational efficiency of the working device 2.

(Processing in Controller 5)

Next, a specific flow of processing executed in the controller 5 will be described with reference to FIG. 5.

Figure 5:
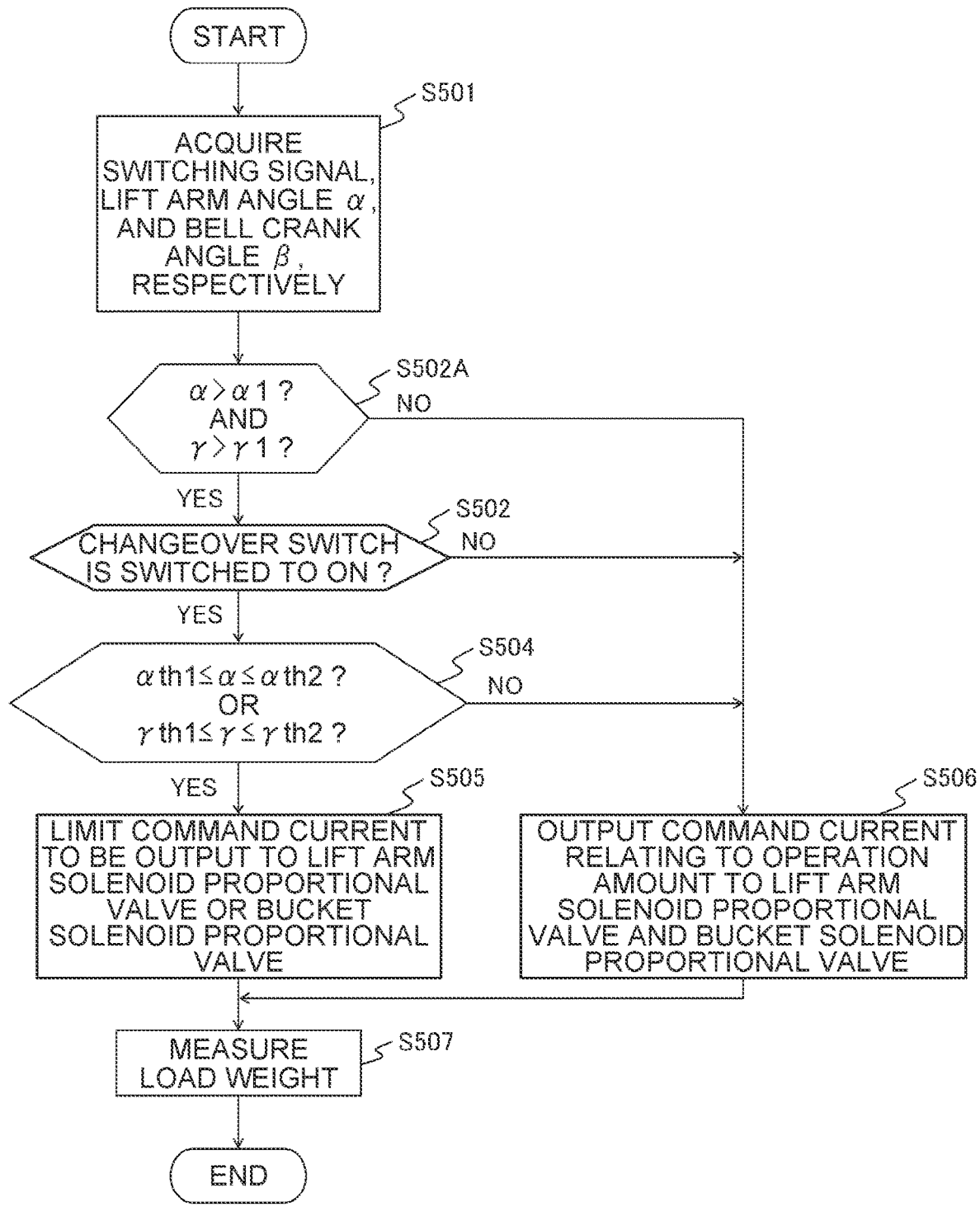
FIG. 5 is a flowchart illustrating a flow of processing to be executed by a controller according to the first embodiment.

FIG. 5 is a flowchart illustrating a flow of the processing executed by the controller 5 according to the first embodiment.

In the controller 5 according to the present embodiment, firstly, the data acquisition section 50 acquires the switching signal output from the changeover switch 121, the lift arm angle $\alpha$ detected by the lift arm angle sensor 31, and the bell crank angle $\beta$ detected by the bell crank angle sensor 32, respectively (step S501).

Next, the load measurement condition determination section 51 determines whether the lift arm angle $\alpha$ acquired in step S501 is more than the condition threshold value $\alpha 1$ and the bucket angle $\gamma$ calculated based on the bell crank angle $\beta$ acquired in step S501 is more than the condition threshold value $\gamma 1$ (step S502A).

In step S502A, when it is determined that the lift arm angle $\alpha$ is more than the condition threshold value $\alpha 1$ and the bucket angle $\gamma$ is more than the condition threshold value $\gamma 1$ ($\alpha > \alpha 1$ and $\gamma > \gamma 1$) (step S502A/YES), the limitation condition determination section 52 determines, based on the switching signal acquired in step S501, whether the changeover switch 121 is switched to ON, that is, the changeover switch 121 is valid (step S502).

When it is determined in step S502 that the changeover switch 121 is switched to ON (step S502/YES), the limitation condition determination section 52 determines whether the lift arm angle $\alpha$ is equal to or more the first angle threshold value $\alpha th1$ and equal to or less than the second angle threshold value $\alpha th2$, and also determines whether the bucket angle $\gamma$ is equal to or more than the first angle threshold value $\gamma th1$ and equal to or less than the second angle threshold value $\gamma th2$ (step S504). That is, in step S504, it is determined whether either the pistons 222 of the lift arm cylinders 22 or the piston 242 of the bucket cylinder 24 is positioned in the first area.

In step S504, when it is determined that the lift arm angle $\alpha$ is equal to or more than the first angle threshold value $\alpha th1$ and equal to or less than the second angle threshold value $\alpha th2$ ($\alpha th1 \leq \alpha \leq \alpha th2$) (step S504/YES), the signal output section 53 outputs a signal for limiting the command current to be output to the lift arm solenoid proportional valves 45 to reduce the magnitude thereof as the pistons 222 of the lift arm cylinders 22 approaches the first end (step S505).

Furthermore, in step S504, when it is determined that the bucket angle $\gamma$ is equal to or more than the first angle threshold value $\gamma th1$ and equal to or less than the second angle threshold value $\gamma th2$ ($\gamma th1 \leq \gamma \leq \gamma th2$) (step S504/YES), the signal output section 53 outputs a signal for limiting the command current to be output to the bucket solenoid proportional valves 46 to reduce the magnitude thereof as the piston 242 of the bucket cylinder 24 approaches the first end (step S505).

That is, in step S505, the signal output section 53 outputs a signal relating to the limitation for the solenoid proportional valves for controlling the piston which is determined to be positioned in the first area in step S504. Accordingly, when it is determined in step S504 that the pistons 222 of the lift arm cylinders 22 and the piston 242 of the bucket cylinder 24 are positioned in the first area, respectively, the signal output section 53 outputs signals relating to the limitation for both the lift arm solenoid proportional valves 45 and the bucket solenoid proportional valves 46 in step S505.

Then, the load weight correction section 52A corrects and calculates the weight of the load (step S507), and then the processing in the controller 5 is completed.

On the other hand, when it is determined in step S502A that the lift arm angle $\alpha$ is equal to or less than the condition threshold value $\alpha 1$ and the bucket angle $\gamma$ is equal to or less than the condition threshold value $\gamma 1$ ($\alpha \leq \alpha 1$ and $\gamma \leq \gamma 1$) (step S502A/NO), when it is determined in step S502 that the changeover switch 121 is not switched to ON, in other words, the changeover switch 121 is switched to OFF (invalid) (step S502/NO), and when it is determined in step S504 that the lift arm angle $\alpha$ does not satisfy $\alpha th1 \leq \alpha \leq \alpha th2$ ($\alpha < \alpha th1$ or $\alpha > \alpha th2$) and also the bucket angle $\gamma$ does not satisfy $\gamma th1 \leq \gamma \leq \gamma th2$ ($\gamma < \gamma th1$ or $\gamma > \gamma th2$) (step S504/NO), the signal output section 53 outputs the command current based on the operation amount of the operation lever 120 acquired by the data acquisition section 50 to the lift arm solenoid proportional valves 45 and the bucket solenoid proportional valves 46, respectively (step S506).

Then, the load weight calculation section 51A calculates the weight of the load (step S507), and then the processing in the controller 5 is completed.

Second Embodiment

Figure 6:
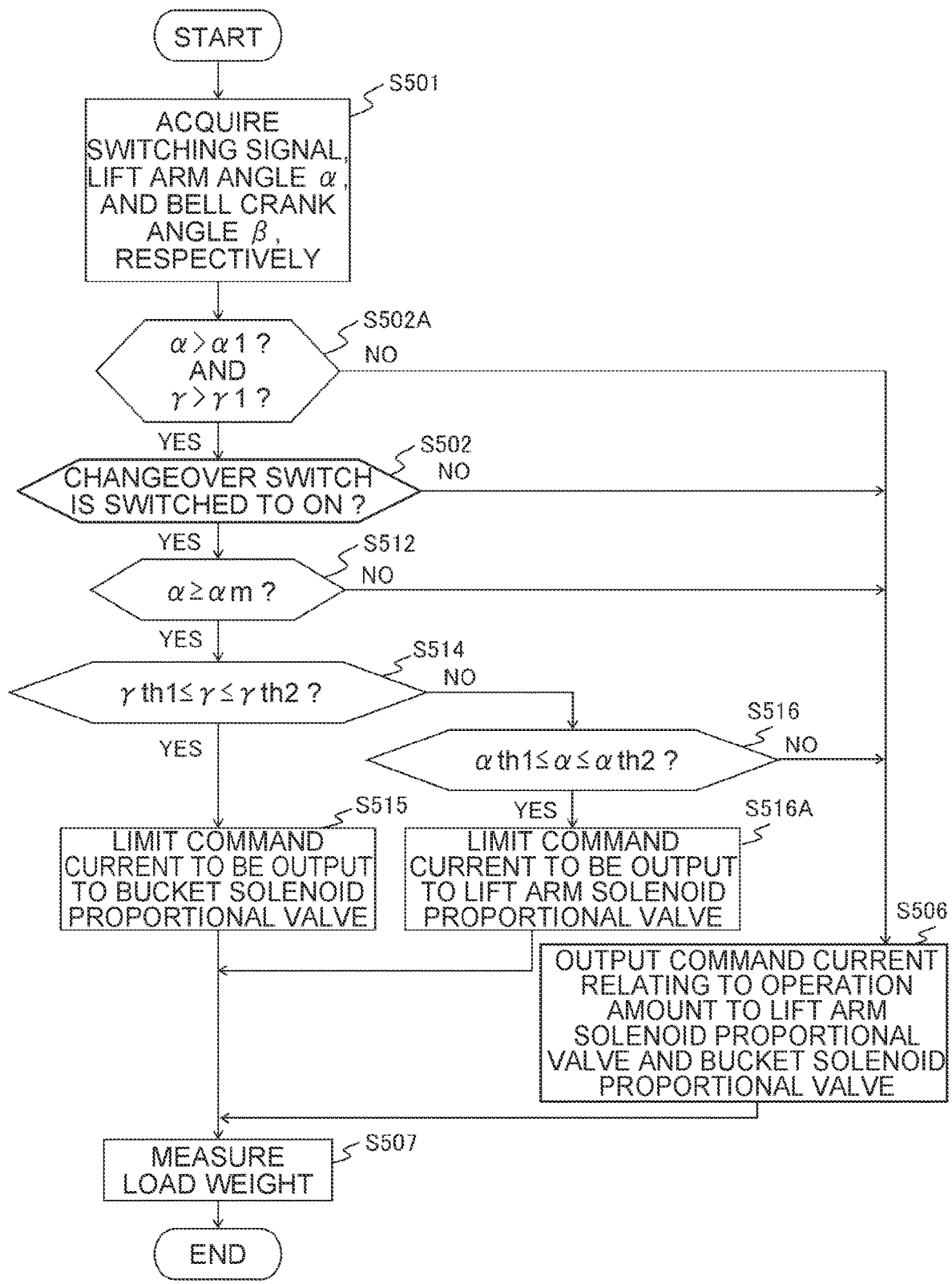
FIG. 6 is a flowchart illustrating a flow of processing to be executed by a controller according to a second embodiment.

Next, the controller 5 according to a second embodiment of the present invention will be described with reference to FIG. 6. In FIG. 6, components common to those described for the controller 5 according to the first embodiment are provided with the same reference signs, and explanation thereof is omitted.

Since the components of the controller 5 according to the present embodiment are the same as those of the controller 5 according to the first embodiment, the functional block diagram thereof is omitted to provide herein (see FIG. 4), and the common components are assigned with the same reference signs.

FIG. 6 is a flowchart illustrating a flow of processing executed by the controller 5 according to the second embodiment.

In the controller 5 according to the present embodiment, the processing proceeds from step S501 to step S502A and step S502, and when it is determined in step S502 that the changeover switch 121 is switched to ON (step S502/YES), the limitation condition determination section 52 determines whether the lift arm angle $\alpha$ is equal to or more than an angle $\alpha m$ corresponding to the height in a state where the lift arm 21 is in the horizontal attitude (hereinafter, simply referred to as a "horizontal attitude angle $\alpha m$") (step S512).

When it is determined in step S512 that the lift arm angle $\alpha$ is equal to or more than the horizontal attitude angle $\alpha m$ ($\alpha \geq \alpha m$) (step S512/YES), the limitation condition determination section 52 determines whether the bucket angle $\gamma$ is equal to or more than the first angle threshold value $\gamma th1$ and equal to or less than the second angle threshold value $\gamma th2$, in other words, the piston 242 of the bucket cylinder 24 is positioned in the first area corresponding to the tilting operation side (step S514).

When it is determined in step S514 that the bucket angle γ is equal to or more than the first angle threshold value γth1 and equal to or less than the second angle threshold value γth2 (γth1≤γ≤γth2) (step S514/YES), the signal output section 53 outputs a signal for limiting the command current to be output to the bucket solenoid proportional valves 46 to reduce the magnitude thereof as the piston 242 of the bucket cylinder 24 approaches the first end (step S515). Then, the load weight correction section 52A corrects and calculates the weight of the load (step S507), and the processing in the controller 5 is completed.

When it is determined in step S514 that γth1≤γ≤γth2 is not satisfied (γ<γth1 or γ>γth2) (step S514/NO), the limitation condition determination section 52 subsequently determines whether the lift arm angle α is equal to or more than the first angle threshold value αth1 and equal to or less than the second angle threshold value αth2 (step S516).

When it is determined in step S516 that the lift arm angle α is equal to or more than the first angle threshold value αth1 and equal to or less than the second angle threshold value αth2 (αth1≤α≤αth2) (step S516/YES), the signal output section 53 outputs a signal for limiting the command current to be output to the lift arm solenoid proportional valves 45 to reduce the magnitude thereof as the pistons 222 of the lift arm cylinders 22 approach the first end (step S516A). Then, the load weight correction section 52A corrects and calculates the weight of the load (step S507), whereby the processing in the controller 5 is completed.

On the other hand, when it is determined in step S512 that the lift arm angle α is not equal to or more than the horizontal attitude angle αm, in other words, the lift arm angle α is less than the horizontal attitude angle αm (α<αm) (step S512/NO), and when it is determined in step S516 that the lift arm angle α does not satisfy αth1≤α≤αth2 (α<αth1 or α>αth2) (step S516/NO), in the same manner as in step S502A/NO and step S502/NO, the processing proceeds to step S506 and step S507, and then the processing in the controller 5 is completed.

As described above, in the present embodiment, when the predetermined load measurement condition is satisfied, the height of the lift arm 21 is equal to or more than the height of the horizontal attitude, and the piston 242 of the bucket cylinder 24 is positioned in the first area provided at the end side of the tilting operation side, the controller 5 limits the command current to be output to the bucket solenoid proportional valves 46 to reduce the magnitude thereof as the piston 242 of the bucket cylinder 24 approaches the first end.

Thus, the operation speed of the working device 2 is limited only when the measurement of the remaining weight of the load, which corresponds to the measurement in the second stage in the controller 5, is performed, and accordingly, it is possible to improve the accuracy of load weight measurement by the controller 5 without reducing the operational efficiency of the working device 2 as much as possible.

Furthermore, in the present embodiment, when the predetermined load measurement condition is satisfied, the height of the lift arm 21 is equal to or more than the height of the horizontal attitude, but the piston 242 of the bucket cylinder 24 is not positioned in the first area, if the pistons 222 of the lift arm cylinder 22 are positioned in the first area at the end side of the lifting operation side, the controller limits the command current to be output to the lift arm solenoid proportional valves 45 to reduce the magnitude thereof as the pistons 222 of the lift arm cylinders 22 approach the first end.

Depending on the size of the dump truck 100 which is a loading destination, there are cases where the lift arm 21 is raised to a position close to the highest position and then the bucket 23 is made to dump. Accordingly, in the measurement of the remaining weight of the load in the controller 5, the pressure in the lift arm cylinders 22 is prevented from being confined.

Third Embodiment

Figure 7:
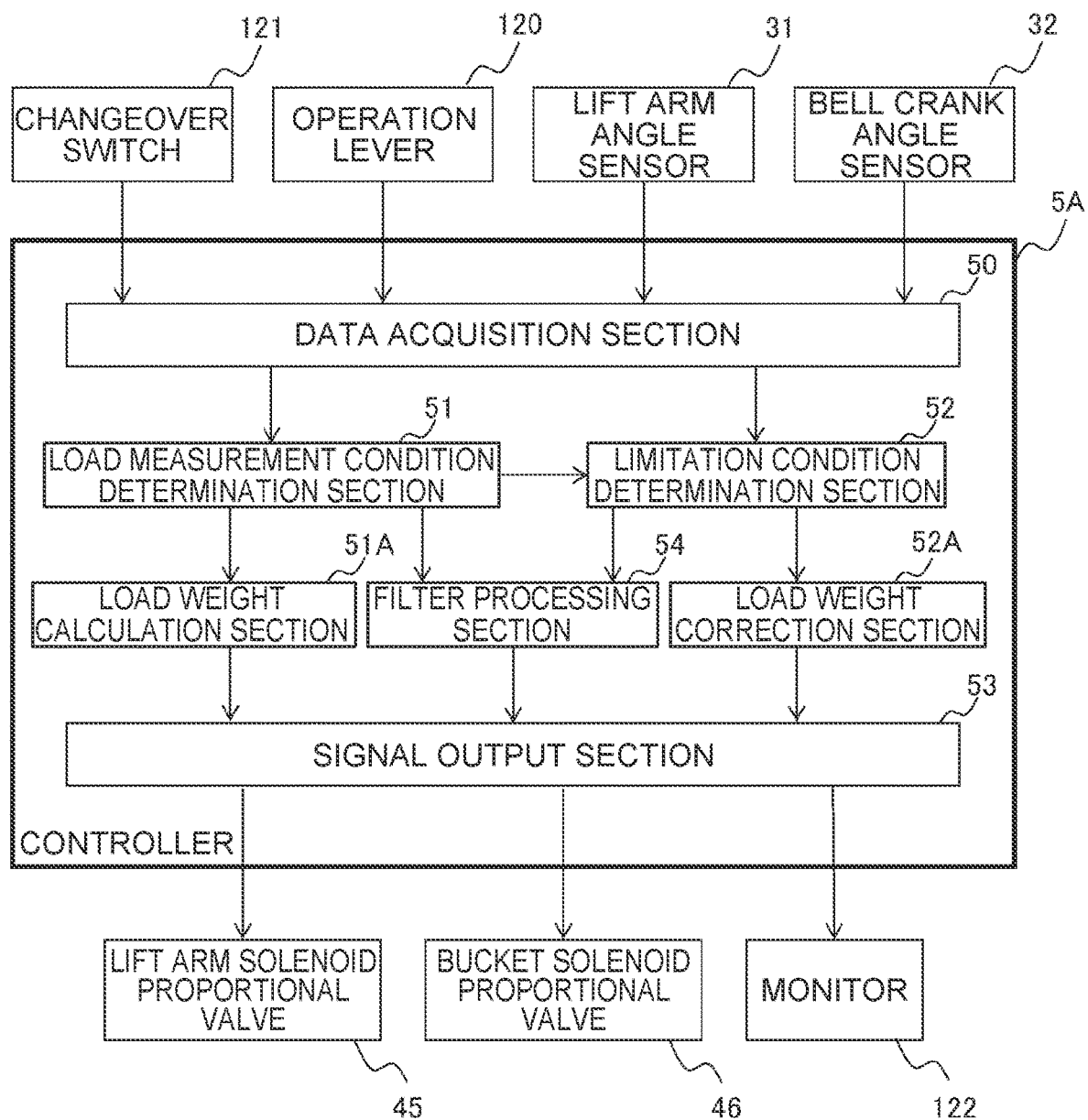
FIG. 7 is a functional block diagram of functions of a controller according to a third embodiment.
Figure 8:
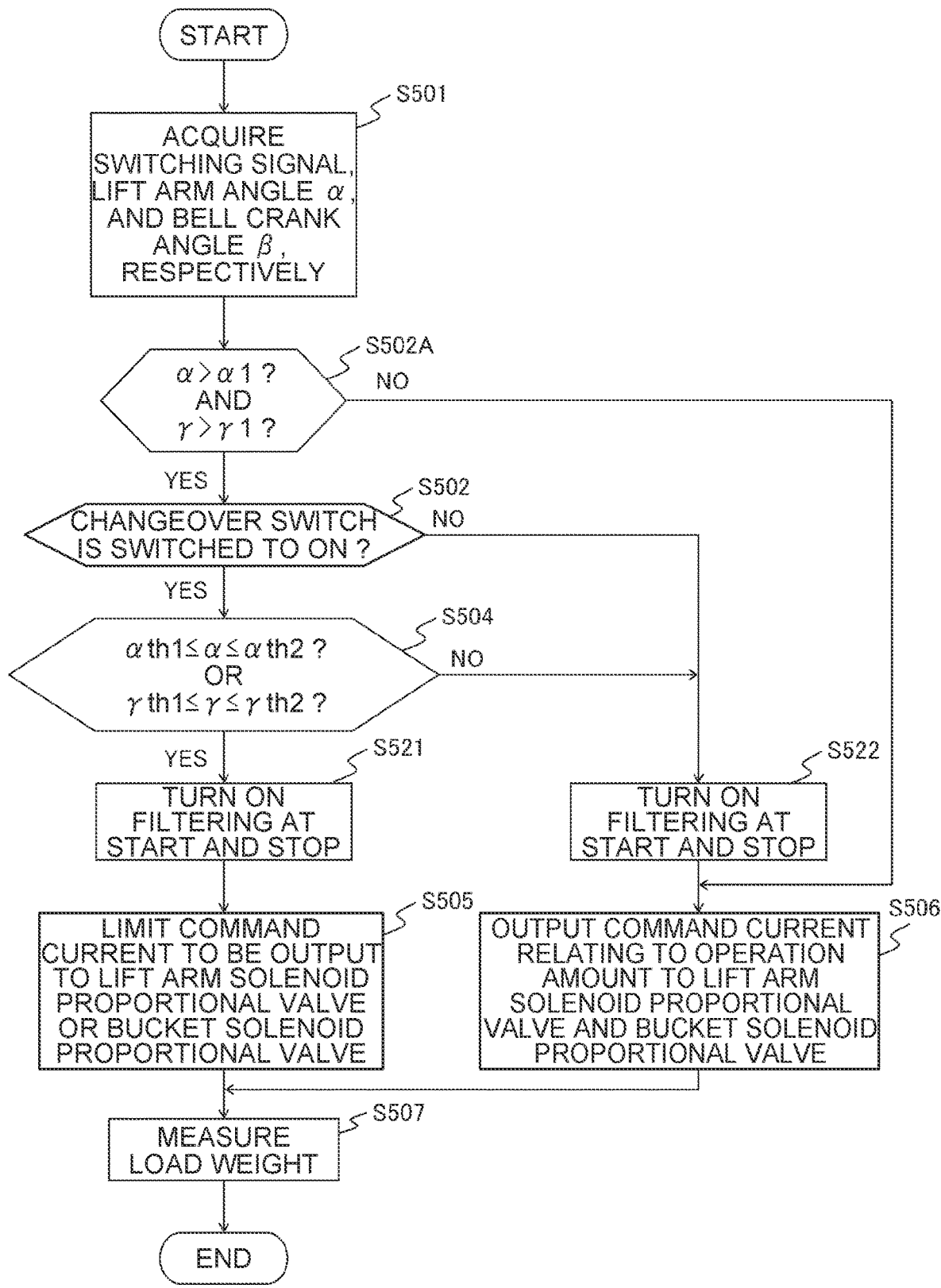
FIG. 8 is a flowchart illustrating a flow of processing to be executed by the controller according to the third embodiment.

Next, a controller 5A according to a third embodiment of the present invention will be described with reference to FIG. 7 and FIG. 8. In FIG. 7 and FIG. 8, components common to those described for the controller 5 according to the first embodiment are provided with the same reference signs, and explanation thereof is omitted FIG. 7 is a functional block diagram illustrating functions of the controller 5A according to the third embodiment. FIG. 8 is a flow chart illustrating a flow of processing executed by the controller 5A according to the third embodiment.

As illustrated in FIG. 7, the controller 5A according to the present embodiment further includes a filter processing section 54, in addition to the data acquisition section 50, the load measurement condition determination section 51, the load weight calculation section 51A, the limitation condition determination section 52, the load weight correction section 52A, and the signal output section 53.

The filter processing section 54 is configured to, when the load measurement condition determination section 51 determines that the predetermined load measurement condition is satisfied, filter the command current to be output to the lift arm solenoid proportional valves 45 so as to delay the rise thereof at the start of movement of the rods 221 and the fall thereof at the stop of movement of the rods 221, respectively, and also filter the command current to be output to the bucket solenoid proportional valves 46 so as to delay the rise thereof at the start of movement of the rod 241 and the fall thereof at the stop of movement of the rod 241, respectively.

As illustrated in FIG. 8, in the controller 5A according to the present embodiment, in the same manner as the first embodiment, the processing proceeds from step S501 to step S502A, step S502, and step S504, and when a determination result in step S504 is YES, the filter processing section 54 turns on the filtering processing with respect to the command current at the start (activation) and stop of movement of the rods 221, 241 (step S521). Thereafter, the processing proceeds to step S505.

Furthermore, when a determination result is NO in step S502 and when a determination result is NO in step S504, the filter processing section 54 turns on the filtering processing with respect to the command current at the start (activation) and stop of movement of the rods 221, 241 (step S522), and thereafter, the processing proceeds to step S506. On the other hand, when a determination result is NO in step S502A, the processing proceeds to step S506 without performing the filtering processing since the predetermined load measurement condition is not satisfied.

Thus, in the present embodiment, not only the rods 221 of the lift arm cylinders 22 and the rod 241 of the bucket cylinder 24 are prevented from colliding with the stroke ends, respectively, so that the pressure confinement in each of the lift arm cylinders 22 and the bucket cylinder 24 can be suppressed, but also the pressure confinement which is caused by rapid start of movement or rapid stop of movement of the rods 221 of the lift arm cylinders 22 and the rod 241 of the bucket cylinder 24 can be suppressed. As a result, it is possible to further improve the accuracy of measurement of the load weight by the controller 5.

Fourth Embodiment

Figure 9:
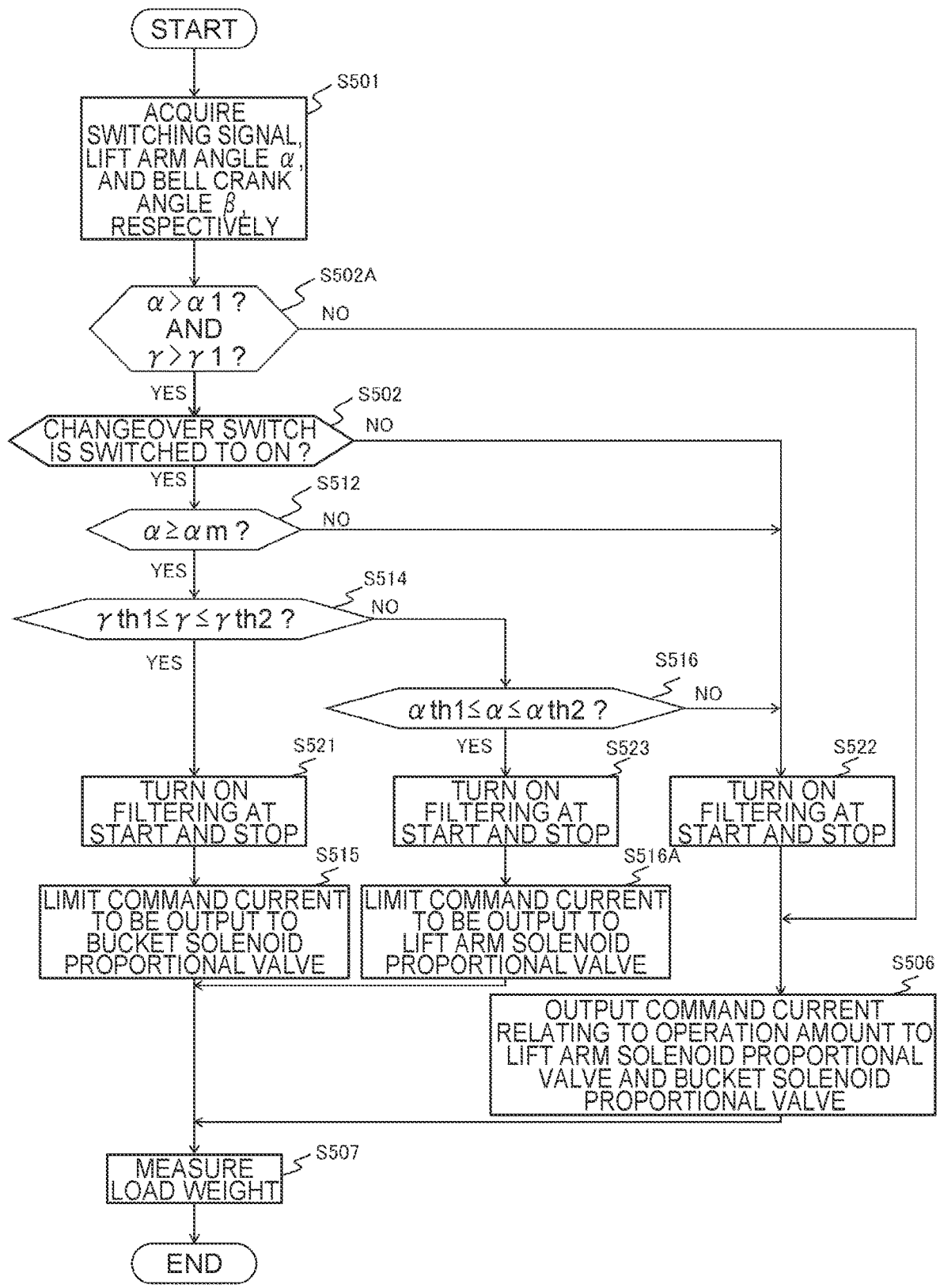
FIG. 9 is a flowchart illustrating a flow of processing to be executed by a controller according to a fourth embodiment.

Next, the controller 5A according to a fourth embodiment of the present invention will be described with reference to FIG. 9. In FIG. 9, components common to those described for the controller 5 according to the first and second embodiments and for the controller 5A according to the third embodiment are provided with the same reference signs, and explanation thereof is omitted.

Since the components of the controller 5 according to the present embodiment are the same as those of the controller 5A according to the third embodiment, the functional block diagram thereof is omitted to provide herein (see FIG. 7), and the common components are assigned with the same reference signs.

FIG. 9 is a flowchart illustrating a flow of processing executed by the controller 5A according to the fourth embodiment.

In the controller 5A according to the present embodiment, in the same manner as the second embodiment, the processing proceeds from step S501 to step S502A, step S502, step S512, and step S514, and when a determination result is YES in step S514, the filter processing section 54 turns on the filtering processing with respect to the command current at the start (activation) and stop of movement of the rod 241 (step S521). Thereafter, the processing proceeds to step S515.

Furthermore, when a determination result is YES in step S516, the filter processing section 54 turns on the filtering processing with respect to the command current at the start (activation) and stop of movement of the rods 221 (step S523). Thereafter, the processing proceeds to step S516A.

When a determination result is NO in step S502, when a determination result is NO in step S512, and when a determination result is NO in step S516, the filter processing section 54 turns on the filter processing with respect to the command current at the start (activation) and stop of movement of the rods 221, 241 (step S522). Thereafter, the processing proceeds to step S506. On the other hand, when a determination result is NO in step S502A, the processing proceeds to step S506 without performing filtering since the predetermined load measurement condition is not satisfied.

Thus, in this embodiment, it is possible to obtain the same advantageous operations and effects as those of the second embodiment and third embodiment, respectively.

Fifth Embodiment

Figure 10:
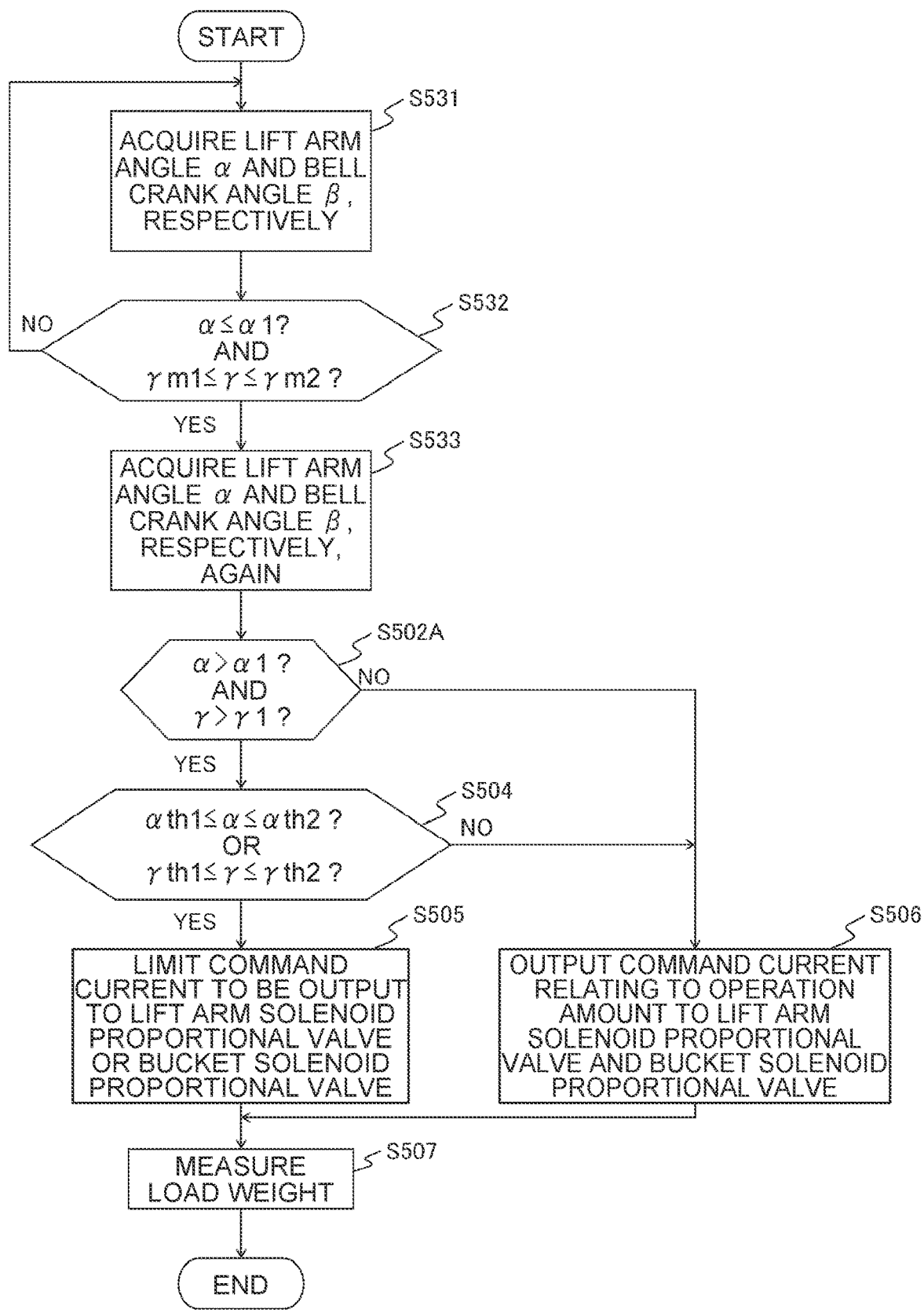
FIG. 10 is a flowchart illustrating a flow of processing to be executed by a controller according to a fifth embodiment.

Next, the controller 5 according to a fifth embodiment of the present invention will be described with reference to FIG. 10. In FIG. 10, components common to those described for the controller 5 according to the first embodiment are provided with the same reference signs, and explanation thereof is omitted.

Since the components of the controller 5 according to the present embodiment are the same as those of the controller 5 according to the first embodiment, the functional block diagram is omitted to provide herein (see FIG. 4), and the common components are assigned with the same reference signs.

FIG. 10 is a flowchart illustrating a flow of processing executed by the controller 5 according to the fifth embodiment.

In the controller 5 according to the present embodiment, firstly, the data acquisition section 50 acquires the lift arm angle α detected by the lift arm angle sensor 31 and the bell crank angle β detected by the bell crank angle sensor 32, respectively (step S531).

Next, the load measurement condition determination section 51 determines whether the lift arm angle α acquired in step S531 is equal to or less than the condition threshold value α1 and the bucket angle γ calculated based on the bell crank angle β acquired in step S531 falls within an angle range (range in which γ is equal to or more than γm1 and equal to or less than γm2) that defines the horizontal attitude of the bucket 23 (step S532). That is, in step S532, the load measurement condition determination section 51 determines whether the wheel loader 1 is performing the excavation work. Note that each of the angle γm1 and the angle γm2 is an angle smaller than the condition threshold value γ1.

When it is determined in step S532 that the lift arm angle α is equal to or less than the condition threshold value α1 (α≤α1) and the bucket angle γ falls within the angle range of the horizontal attitude of the bucket 23 (γm1≤γ≤γm2) (step S532/YES), the data acquisition section 50 acquires the lift arm angle α and the bell crank angle β again (step S533).

Subsequently, the load measurement condition determination section 51 determines whether the lift arm angle α acquired in step S533 is more than the condition threshold value α1 and the bucket angle γ calculated based on the bell crank angle β acquired in step S533 is more than the condition threshold value γ1 (step S502A). When a determination result is YES in step S502A, the processing proceeds to step S504 (in the present embodiment, the changeover switch 121 is not provided). The subsequent processes are the same as those of the controller 5 according to the first embodiment.

On the other hand, when it is determined in step S532 that the lift arm angle α is more than the condition threshold value α1 (α>α1) or the bucket angle γ does not fall within the angle range of the horizontal attitude of the bucket 23 (γ<γm1 or γ>γm2) (step S532/NO), the processing returns to step S531 and repeats the process.

Here, since the measurement of the remaining weight of the load by the controller 5 is performed after the measurement of the total weight of the load which corresponds to the measurement in the first stage, the controller 5 according to the present embodiment is configured to determine whether the measurement of the total weight of the load has been started in step S531 and step S532.

The measurement of the total weight of the load in the controller 5 is performed, as described above, after the wheel loader 1 performs the excavation work and while the lift arm 21 is being raised with the bucket 23 being fully tilted. Accordingly, in step S531 and step S532, the controller 5 determines the attitude of the working device 2 during the excavation work of the wheel loader 1 based on the lift arm angle α detected by the lift arm angle sensor 31 and the bell crank angle β detected by the bell crank angle sensor 32. That is, in the present embodiment, the predetermined load measurement condition includes a further condition in which the excavation work has been performed.

As described above, in the present embodiment, the start of the measurement of the total weight of the load by the controller 5 is set in the predetermined load measurement condition so that the operation speed of the working device 2 can be limited only for the measurement of the remaining weight of the load. As a result, it is possible to improve the accuracy of measurement of the load weight by the controller 5 without reducing the operational efficiency of the working device 2 as much as possible.

Sixth Embodiment

Figure 11:
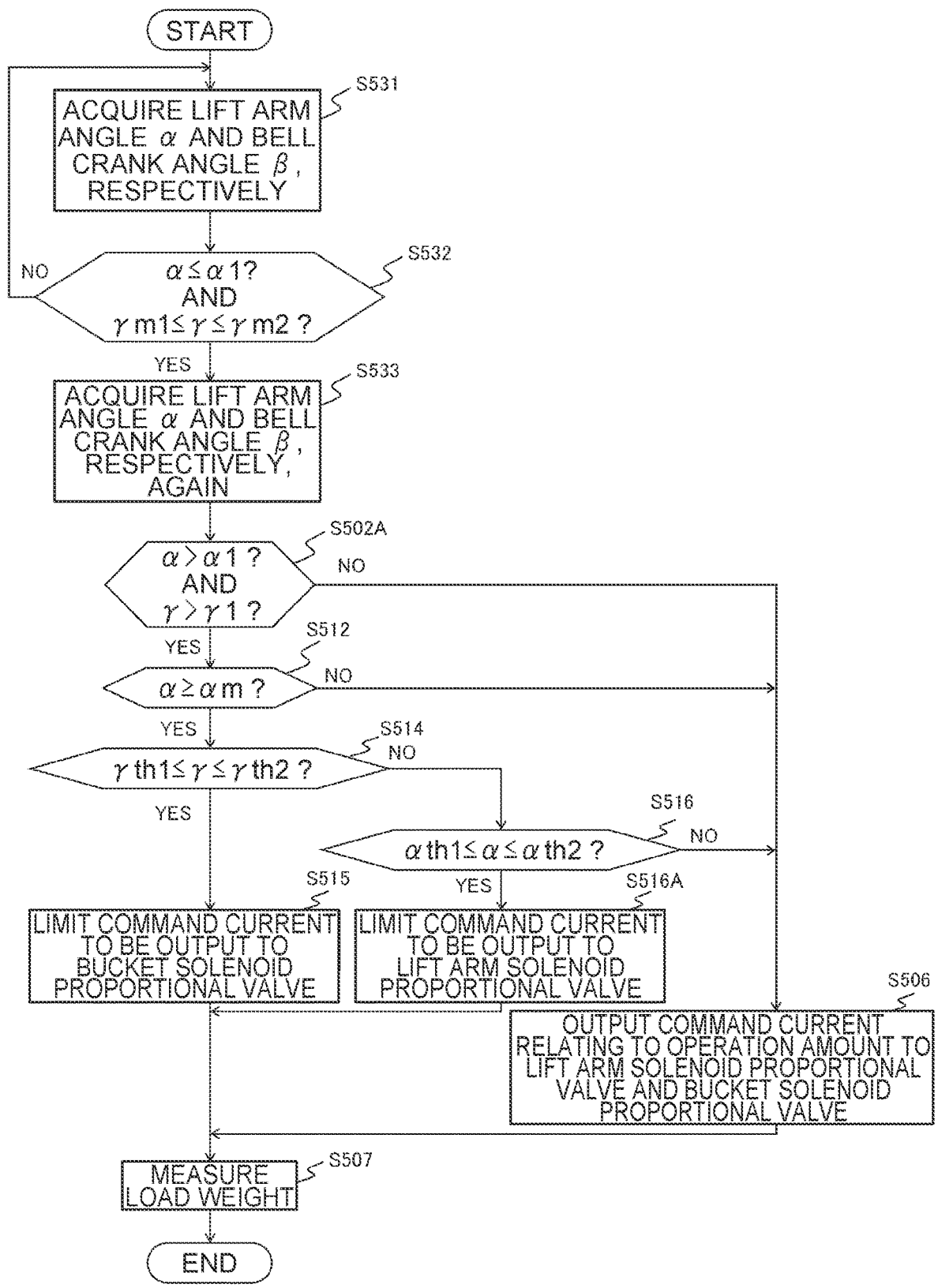
FIG. 11 is a flowchart illustrating a flow of processing to be executed by a controller according to a sixth embodiment.

Next, the controller 5 according to a sixth embodiment of the present invention will be described with reference to FIG. 11. In FIG. 11, components common to those described for the controller 5 according to the first, second, and fifth embodiments are provided with the same reference signs, and explanation thereof is omitted.

Since the components of the controller 5 according to the present embodiment are the same as those of the controller 5 according to the first embodiment, the functional block diagram is omitted to provide herein (see FIG. 4), and the common components are assigned with the same reference signs.

FIG. 11 is a flowchart illustrating a flow of processing executed by the controller 5 according to the sixth embodiment.

In the controller 5 according to the present embodiment, in the same manner as the controller 5 according to the fifth embodiment, the processing proceeds from step S531 to step S532 and step S533, and then proceeds to step S502A. When a determination result is YES in step S502A, the processing proceeds to step S512 (the changeover switch 121 is not provided in the present embodiment). The subsequent processes are the same as those of the controller 5 (see FIG. 6) according to the second embodiment.

Thus, in this embodiment, it is possible to obtain the same advantageous operations and effects as those of the second and fifth embodiments, respectively.

Seventh Embodiment

Figure 12:
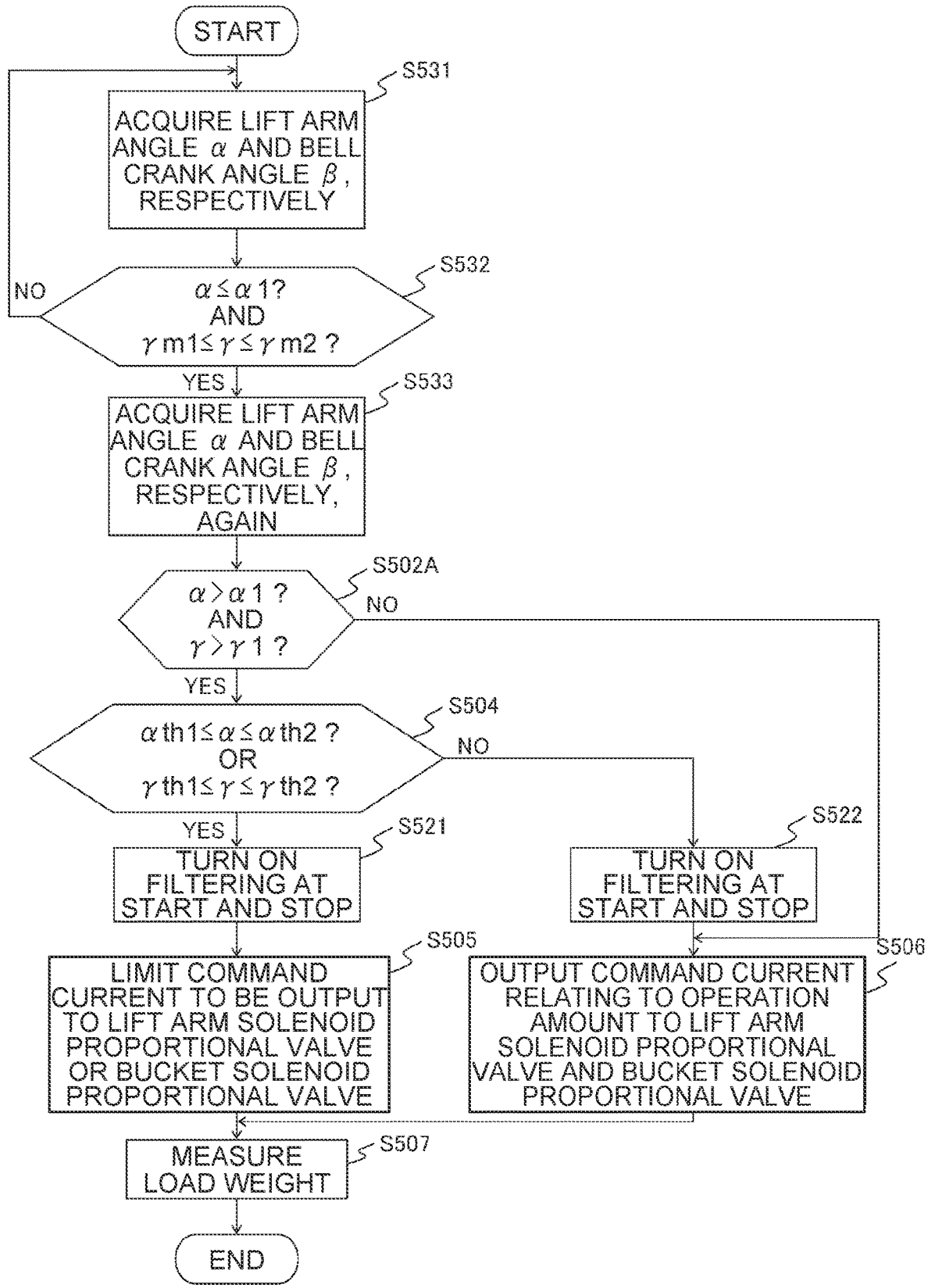
FIG. 12 is a flowchart illustrating a flow of processing to be executed by a controller according to a seventh embodiment.

Next, the controller 5A according to a seventh embodiment of the present invention will be described with reference to FIG. 12. In FIG. 12, components common to those described for the controller 5 according to the first and fifth embodiments and the controller 5A according to the third embodiment are provided with the same reference signs, and explanation thereof is omitted.

Since the components of the controller 5A according to the present embodiment are the same as those of the controller 5A according to the third embodiment, the functional block diagram is omitted to provide herein (see FIG. 7), and the common components are assigned with the same reference signs.

FIG. 12 is a flowchart illustrating a flow of processing executed by the controller 5A according to the seventh embodiment.

In the controller 5A according to the present embodiment, in the same manner as the controller 5 according to the fifth and sixth embodiments, the processing proceeds from step S531 to step S532 and step S533, and then proceeds to step S502A. When a determination result is YES in step S502A, the processing proceeds to step S504 in the same manner as in the fifth embodiment (the changeover switch 121 is not provided in the present embodiment). The subsequent processes are the same as those of the controller 5A according to the third embodiment.

Thus, in this embodiment, it is possible to obtain the same advantageous operations and effects as those of the third and fifth embodiments, respectively.

Eighth Embodiment

Figure 13:
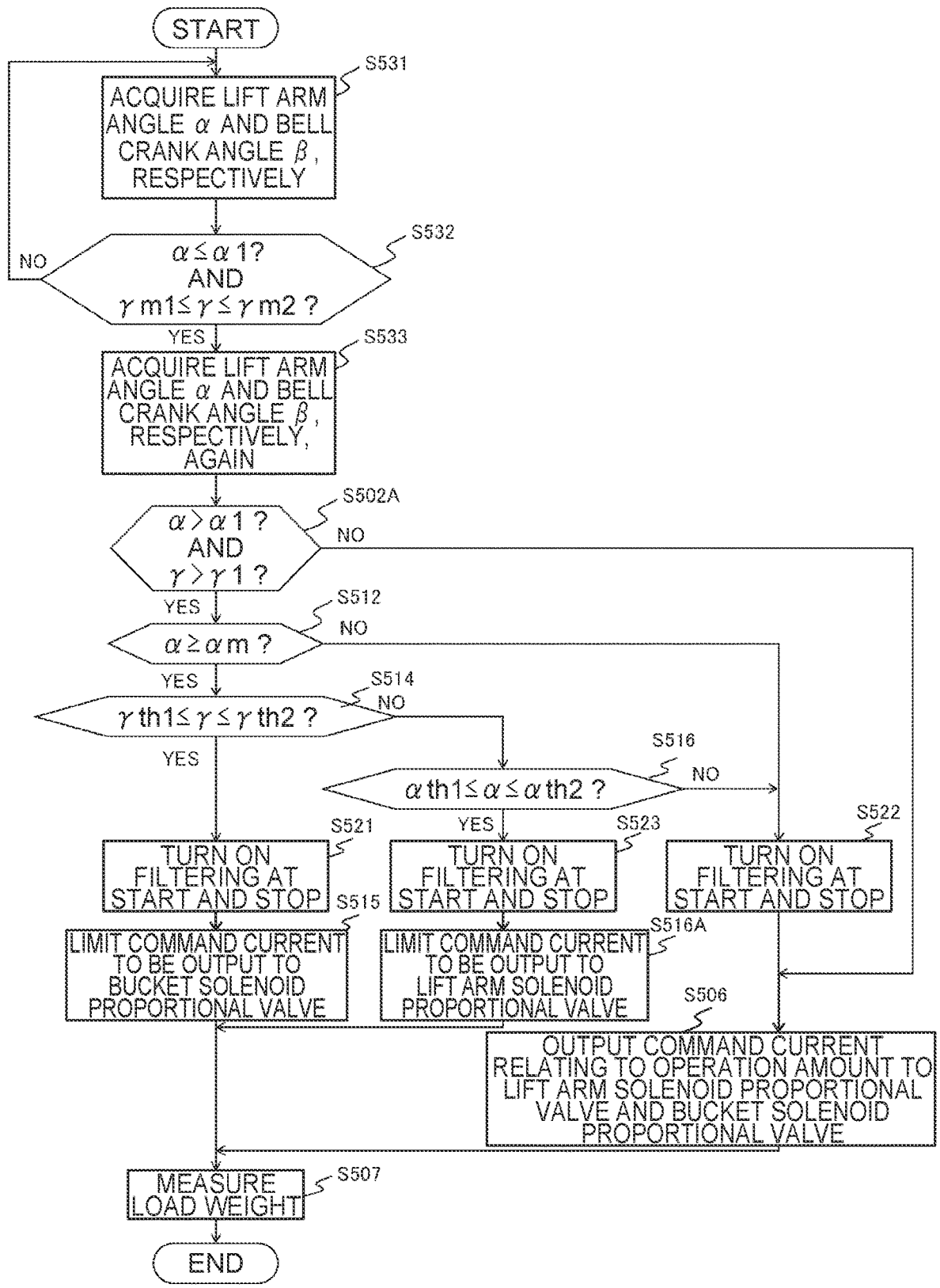
FIG. 13 is a flowchart illustrating a flow of processing to be executed by a controller according to an eighth embodiment.

Next, the controller 5A according to an eighth embodiment of the present invention will be described with reference to FIG. 13. In FIG. 13, components common to those described for the controller 5 according to the first, second, and fifth embodiments and the controller 5A according to the third embodiment are provided with the same reference signs, and explanation thereof is omitted.

Since the components of the controller 5A according to the present embodiment are the same as those of the controller 5A according to the third embodiment, the functional block diagram is omitted to provide herein (see FIG. 7), and the common components are assigned with the same reference signs.

FIG. 13 is a flowchart illustrating a flow of processing executed by the controller 5A according to the eighth embodiment.

In the controller 5A according to the present embodiment, in the same manner as the controllers 5, 5A according to the fifth to seventh embodiments, the processing proceeds from step S531 to step S532 and step S533, and then proceeds to step S502A. When a determination result is YES in step S502A, the processing proceeds to step S512 in the same manner as in the sixth embodiment (the changeover switch 121 is not provided in the present embodiment). The subsequent processes are the same as those of the controller 5A according to the fourth embodiment.

Thus, in this embodiment, it is possible to obtain the same advantageous operations and effects as those of the fourth and fifth embodiments, respectively.

In the above, the present invention has been described with reference to each of the embodiments of the present invention. The invention is not limited to each of the embodiments described above, and various modifications may be made therein. For example, each of the embodiments are described in detail herein for the purpose of clarity and a concise description, and the present invention is not necessarily limited to those including all the features described above. Furthermore, some of the features according to a predetermined embodiment can be replaced with other features according to the separate embodiments, and other features can be added to the configuration of a predetermined embodiment. Still further, some of the features can include other features of the separate embodiments, be deleted, and/or replaced.

For example, in each of the embodiments described above, the wheel loader 1 has been described as one of the aspects of construction machines, however, the present invention is not limited thereto. For example, the present invention can be applied to a construction machine equipped with a hydraulically driven working device, such as a crawler type hydraulic excavator.

Furthermore, in each of the embodiments described above, the controllers 5, 5A are configured to limit the operational actions at the extension side of the rods 221 in the lift arm cylinders 22 and those at the extension side of the rod 241 in the bucket cylinder 24. However, the limitation is not necessarily for the extension side, and the controllers 5, 5A may be configured to limit the operational actions at the contraction side (lowering operation side of the lift arm 21) of the rods 221 in the lift arm cylinders 22 and those at the contraction side (dumping operation side of the bucket 23) of the rod 241 in the bucket cylinder 24.

REFERENCE SIGNS LIST

1: wheel loader (construction machine)
2: working device 5, 5A: controller
21: lift arm
22: lift arm cylinder (hydraulic cylinder)
22A, 24A: rod chamber
23: bucket
24: bucket cylinder (hydraulic cylinder)
31: lift arm angle sensor (attitude sensor)
32: bell crank angle sensor (attitude sensor)
33: lift arm pressure sensor (pressure sensor)
34: bucket pressure sensor (pressure sensor)
41: hydraulic pump
42: pilot pump (pilot hydraulic pump)
43: lift arm directional control valve (directional control valve)
44: bucket directional control valve (directional control valve)
45: lift arm solenoid proportional valve (solenoid valve)
46: bucket solenoid proportional valve (solenoid valve)
120: operation lever
121: changeover switch (changeover device)
221, 241: rod
222, 242: piston

The invention claimed is:

1. A construction machine, comprising:
a hydraulic pump driven by an engine;
a hydraulic cylinder operated by pressure oil discharged from the hydraulic pump;
a working device operated in a vertical direction by the hydraulic cylinder;
a directional control valve provided between the hydraulic pump and the hydraulic cylinder, the directional control valve being configured to control a direction and flow rate of the pressure oil to be supplied from the hydraulic pump to the hydraulic cylinder;
a pilot hydraulic pump for supplying pilot pressure oil to the directional control valve;
a solenoid valve configured to control pressure of the pilot pressure oil to be supplied from the pilot hydraulic pump to the directional control valve;
an operation lever for outputting a signal for controlling the directional control valve via the solenoid valve;
a pressure sensor configured to detect pressure of the hydraulic cylinder;
an attitude sensor configured to detect an attitude of the working device; and
a controller configured to measure a weight of a load loaded on the working device based on the pressure of the hydraulic cylinder detected by the pressure sensor and the attitude of the working device detected by the attitude sensor,
wherein
the construction machine comprises a switching device for switching whether to measure the weight of the load, and
the controller is configured to, in a case where the attitude of the working device detected by the attitude sensor satisfies a predetermined load measurement condition, the switching device is valid, and a piston of the hydraulic cylinder is positioned in a first area provided in a predetermined area at a side of a first end which is one end of the hydraulic cylinder, or in a second area provided in a predetermined area at a side of a second end which is another end of the hydraulic cylinder, limit a command current to be output to the solenoid valve to reduce magnitude thereof as the piston approaches the first end or the second end.

2. The construction machine according to claim 1, wherein
the working device includes:
a lift arm with a proximal end rotatably attached to a frame; and
a bucket rotatably attached to a distal end portion of the lift arm,
the hydraulic cylinder is a lift arm cylinder for driving the lift arm, and
the controller is configured to, in a case where the predetermined load measurement condition is satisfied, the switching device is valid, and the piston of the lift arm cylinder is positioned in the first area provided at an end side of a rod chamber side corresponding to a lifting operation of the lift arm, which serves as the first end of the lift arm cylinder, limit the command current to be output to the solenoid valve for controlling the lift arm cylinder to reduce the magnitude thereof as the piston approaches the first end.

3. The construction machine according to claim 1, wherein
the working device includes:
a lift arm with a proximal end rotatably attached to a frame; and
a bucket rotatably attached to a distal end portion of the lift arm,
the hydraulic cylinder is a bucket cylinder for driving the bucket, and
the controller is configured to, in a case where the predetermined load measurement condition is satisfied, the switching device is valid, a height of the lift arm is equal to or more than a height in a state where the lift arm is in a horizontal attitude, and the piston of the bucket cylinder is positioned in the first area provided at an end side of a rod chamber side corresponding to a tilting operation of the bucket, which serves as the first end of the bucket cylinder, limit the command current to be output to the solenoid valve for controlling the bucket cylinder to reduce the magnitude thereof as the piston approaches the first end.

4. The construction machine according to claim 1, wherein
the controller is configured to:
in a case where the predetermined load measurement condition is satisfied, perform filtering processing with respect to the command current to be output to the solenoid valve to delay rise of the command current at start of movement of a rod of the hydraulic cylinder and fall of the command current at stop of the movement of the rod, respectively; and
in a case where the predetermined load measurement condition is satisfied, the switching device is valid, and the piston is positioned in the first area or in the second area, perform the filtering processing with respect to the command current to be output to the solenoid valve, and also limit the command current to be output to the solenoid valve to reduce the magnitude thereof as the piston approaches the first end or the second end.

* * * * *